(12) United States Patent
Hudson et al.

(10) Patent No.: US 11,448,062 B2
(45) Date of Patent: Sep. 20, 2022

(54) WELL INSTALLATIONS

(71) Applicant: METROL TECHNOLOGY LTD, Aberdeen (GB)

(72) Inventors: Steve Martin Hudson, Aberdeen (GB); Leslie David Jarvis, Aberdeen (GB)

(73) Assignee: METROL TECHNOLOGY LTD., Aberdeenshire (GB)

( * ) Notice: Subject to any disclaimer, the term of this patent is extended or adjusted under 35 U.S.C. 154(b) by 68 days.

(21) Appl. No.: 17/041,708

(22) PCT Filed: Jun. 29, 2018

(86) PCT No.: PCT/GB2018/051844
§ 371 (c)(1),
(2) Date: Sep. 25, 2020

(87) PCT Pub. No.: WO2019/186087
PCT Pub. Date: Oct. 3, 2019

(65) Prior Publication Data
US 2021/0123342 A1      Apr. 29, 2021

(30) Foreign Application Priority Data

Mar. 28, 2018   (WO) ............... PCT/GB2018/050841

(51) Int. Cl.
*E21B 47/12*     (2012.01)
*E21B 47/13*     (2012.01)
(Continued)

(52) U.S. Cl.
CPC ............. *E21B 47/12* (2013.01); *E21B 17/00* (2013.01); *E21B 41/00* (2013.01); *E21B 47/13* (2020.05);
(Continued)

(58) Field of Classification Search
CPC .......... E21B 47/13; E21B 17/00; E21B 41/00; E21B 47/14; E21B 47/16; E21B 41/0085; E21B 47/12; H04B 7/15507
See application file for complete search history.

(56) References Cited

U.S. PATENT DOCUMENTS

| 5,394,141 A | 2/1995 | Soulier |
| 2003/0042016 A1 | 3/2003 | Vinegar et al. |

(Continued)

FOREIGN PATENT DOCUMENTS

| EP | 0 314 654 A1 | 5/1989 |
| NO | 20151746 A1 | 12/2015 |

(Continued)

OTHER PUBLICATIONS

International Search Report and Written Opinion of the ISA for PCT/GB2018/051844 dated Dec. 7, 2018, 25 pages.

*Primary Examiner* — Brad Harcourt
(74) *Attorney, Agent, or Firm* — Nixon & Vanderhye, PC

(57) ABSTRACT

Well installations and methods for constructing wireless ready well installations. The installations comprise downhole metallic structure (2) and downhole repeater apparatus (5) for receiving signals and in response transmitting signals onwards. The repeater apparatus (5) are arranged for at least one of receiving the signals by picking up at least one of electrical and acoustic signals from the downhole metallic structure and transmitting the signals onwards by applying at least one of electrical and acoustic signals to the downhole metallic structure. Various arrangement and methods are described to allow provision of well installations ready for wireless communications.

37 Claims, 8 Drawing Sheets

(51) Int. Cl.
*E21B 17/00* (2006.01)
*E21B 41/00* (2006.01)
*E21B 47/14* (2006.01)
*H04B 7/155* (2006.01)

(52) U.S. Cl.
CPC ......... *E21B 47/14* (2013.01); *H04B 7/15507* (2013.01)

(56) References Cited

U.S. PATENT DOCUMENTS

| | | |
|---|---|---|
| 2008/0007422 A1 | 1/2008 | Hudson |
| 2010/0181067 A1* | 7/2010 | Chen ................... E21B 41/0035 166/253.1 |
| 2013/0299165 A1 | 11/2013 | Crow |
| 2013/0321165 A1 | 12/2013 | Johannessen |
| 2014/0218208 A1 | 8/2014 | Hudson |
| 2014/0320301 A1 | 10/2014 | Hudson |
| 2015/0354351 A1 | 12/2015 | Morrow et al. |
| 2016/0341030 A1 | 11/2016 | Mulholland et al. |
| 2017/0081956 A1 | 3/2017 | Ganguly et al. |
| 2018/0094519 A1 | 4/2018 | Stephens et al. |

FOREIGN PATENT DOCUMENTS

| | | |
|---|---|---|
| WO | WO 99/60250 | 11/1999 |
| WO | WO 2010/083210 A1 | 7/2010 |
| WO | WO 2016/076875 A1 | 5/2016 |
| WO | WO 2018/178607 A1 | 10/2018 |

* cited by examiner

WELL INSTALLATIONS

This application is the U.S. national phase of International Application No. PCT/GB2018/051844 filed Jun. 29, 2018 which designated the U.S. and claims priority to International Application No. PCT/GB2018/050841 filed Mar. 28, 2018, the entire contents of each of which are hereby incorporated by reference.

This invention relates to well installations and in particular to well installations in which there is a desire to communicate. In a number of circumstances there is a desire to communicate in an oil and/or gas well installation and to provide well installations which facilitate communication.

Various different techniques may be used for communicating in well installations and in each case there are a number of factors to take into account. One of these factors is how signals are to be sent from the surface down into the well and/or extracted from downhole to the surface and another factor is what range can be achieved using the communication system.

Sometimes it will be apparent that a communication system is needed from the outset and in other cases it may only be later that it becomes apparent that such communication will be useful.

In existing systems it can be difficult or expensive to retrospectively provide communications in a well installation where the need is not seen at the outset.

Of particular interest are "wireless" communication methods where at least some part of the communication channel is not implemented using electrically signals carried on conventional electrical cables. In many cases having at least a portion of a communication channel between two locations in a well installation implemented using a wireless technique is the most practical way to proceed.

EM (electromagnetic) communication techniques are often used for some part of the communication channel in downhole communication systems. These EM systems make use of the metallic structure (eg casing, tubing, liner or so on) in the well installation for carrying the signal along part of a signal channel between corresponding communication units. Similarly acoustic systems can make use of the metallic structure for signalling. In such cases it can be useful to have repeater apparatus provided in the well installation for picking up signals from the downhole metallic structure and/or applying signals to the downhole metallic structure.

In order to ease installation, connection, and communication such repeater apparatus might most typically be provided at location which is not in an annulus. That is provided on the outside of downhole metallic pipe be this production tubing, casing, or liner, at a location where the repeater is exposed to the formation. Providing a repeater in such a location can help in the application of signals to and/or pick up of signals from the downhole metallic structure in an EM system. However, equipment provided at such a location may be prone to damage.

Provision of power to such systems is also factor that needs to be considered.

Therefore, it would be desirable to provide alternative arrangements for allowing communication in well installations.

According to one aspect of the invention there is provided a well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, preferably wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe.

The well installation may be a wireless communication enabled well installation.

Note that the "first" and "second" runs of metallic pipe are introduced as labels not to indicate the order in which the runs are introduced into the installation. Typically the outermost run of pipe will be installed first in construction of a well, and then in order inwards.

The repeater apparatus may be installed into the well installation during a construction phase; and the repeater apparatus may comprise a repeater arrangement which arrangement is mounted on a length of downhole metallic pipe before this is introduced into the borehole as part of one of the runs of downhole metallic pipe.

The well installation may comprise a long term power source for powering the repeater apparatus.

The repeater apparatus may comprise a local battery.

The well installation may comprise in addition to a local battery another power source for powering the repeater apparatus. Said other power source may be arranged to provide a longer power lifetime than said local battery where the local battery is a primary battery—such a power source may be considered a long term power source. Primary battery is being used here in the sense of a non-rechargeable battery.

These features can help in providing an installation where it is realistic to install the repeater apparatus at an early stage, say a construction phase of the well, and have the repeater assist communication over the period desired, potentially throughout the life of the well.

The well installation may comprise a remote power arrangement comprising a remote power source for powering the repeater apparatus. That is to say a power source which is provided at a location which is spaced from the region where the repeater apparatus is arranged for at least one of picking up signals from the downhole metallic structure and applying signals to the downhole metallic structure.

According to another aspect of the invention there is provided a wireless communication enabled well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe; and the well installation comprises a remote power arrangement comprising a remote power source for powering the repeater apparatus, said remote power source being provided at a location which is spaced from the region where the repeater apparatus is arranged for at least one of picking up signals from the downhole metallic structure and applying signals to the downhole metallic structure.

The provision of a remote power arrangement is one way of providing a system with long term power for powering the repeater.

The remote power source may comprise a battery pack disposed at a shallower location in the borehole than a location at which the repeater apparatus at least one of picks up signals from and applies signals to the downhole metallic structure. More detail concerning optional features of this approach is given further below.

The remote power arrangement may comprise a harvesting device for harvesting electrical power from the downhole metallic structure. Here the remote power source may comprise an electrical power source for applying electrical current to the downhole structure—this may be primarily for cathodic protection purposes, to provide a source of power, or other reasons. The remote power source may comprise a plurality of sacrificial cathodic protection anodes. More detail concerning optional features of this approach is given further below.

The remote power arrangement may comprise an electrical power source connected to the repeater via an electrical cable. The electrical power source may be located out of the bore hole—say at a land surface, a mudline, on a platform or a vessel.

This approach is attractive where possible but it typically requires running a cable to the repeater location from an out of hole location which is not always feasible.

Where such a cable is provided it may be used as a leg in a communication channel. The repeater apparatus may be arranged to apply signals to and/or pick signals up from the cable. One approach in such a case is to signal using impedance modulation. That is to say, the repeater apparatus may be arranged to transmit signals along said cable by varying the impedance introduced into the signal circuit including said cable to encode data. The effect of this varying impedance may then be detected at a remote location, say at the electrical power source by monitoring voltage and/or current.

In one set of embodiments the well installation comprises:

a remote power arrangement comprising an electrical power source connected to the repeater via an electrical cable; and a communication unit at a location spaced from the repeater apparatus which communication unit is arranged for sensing voltage and/or current in a signal circuit including said cable, wherein the repeater apparatus comprises variable impedance means for varying the impedance introduced into the signal circuit including said cable to encode data, and the communication unit is arranged to extract said data by monitoring variations in the voltage and/or current caused by the variable impedance means.

This can reduce power requirements for transmission.

The remote power arrangement may comprise at least one of:

a battery pack disposed at a shallower location in the borehole than a location at which the repeater apparatus at least one of picks up signals from and applies signals to the downhole metallic structure;

a harvesting device for harvesting electrical power from the downhole metallic structure; and an electrical power source connected to the repeater via an electrical cable.

The repeater apparatus may be arranged for use with electrical signals and/or acoustic signals.

In particular the repeater apparatus may be arranged for applying and/or picking up electrical signals and/or acoustic signals to/from the downhole metallic structure.

As an example, acoustic signals may be used in one leg of a communications channel on one side of the repeater apparatus and electrical signals in another leg on another side of the repeater apparatus—in this way the repeater apparatus can be considered to act as a bridge between EM and acoustic signalling. Alternatively acoustic and electrical signals may be available in parallel, either for regular use and/or to introduce redundancy.

According to another aspect of the invention there is provided a wireless communication enabled well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe;

the repeater apparatus is installed into the well installation during a construction phase; and the repeater apparatus comprises a repeater arrangement which arrangement is mounted on a length of downhole metallic pipe before this is introduced into the borehole as part of one of the runs of downhole metallic pipe.

This approach can be used in situations where there is an intention to use the repeater at that stage or at later stages, or as a precaution in case it becomes useful. In this sense the well installation can be rendered a "wireless ready" well installation by installation of the repeater. Proceeding in this way can be considered to allow the provision of a communications backbone within the well installation.

The first run of downhole metallic pipe may extend further into the borehole than the second run of downhole metallic pipe, such that the second run of downhole metallic pipe has a lower end past which the first run of downhole metallic pipe extends.

The installation may further comprise an insulating centraliser provided in the annulus towards the lower end of the second run of downhole metallic pipe for holding the second run of downhole metallic pipe away from the first run of downhole metallic pipe and the repeater apparatus may be disposed in the annulus and arranged for at least one of picking up signals from the downhole metallic structure in the region of the insulating centraliser and applying signals to the downhole metallic structure in the region of the insulating centraliser.

The repeater apparatus may be disposed in the region of the lower end of the second run of downhole metallic pipe and arranged for at least one of picking up signals from the downhole metallic structure in the region of said lower end and applying signals to the downhole metallic structure in the region of said lower end.

According to another aspect of the invention there is provided a well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe, the first run of downhole metallic pipe extending further into the borehole than the second run of downhole metallic pipe, such that the second run of downhole metallic pipe has a lower end past which the first run of downhole metallic pipe extends and the repeater apparatus is disposed in the region of the lower end of the second run of downhole metallic pipe and arranged for at least one of picking up signals from the downhole metallic structure in the region of said lower end and applying signals to the downhole metallic structure in the region of said lower end.

This can lead to a well installation in which the repeater is disposed in a protected location. This is true whether the repeater apparatus is within the annulus or just beyond the lower end of the second run of downhole metallic pipe.

The repeater apparatus being disposed in the region of the lower end of the second run of downhole metallic pipe may mean at least one of:

the repeater apparatus is disposed within the annulus defined by the first and second runs of downhole metallic pipe and within 100 m of, or more preferably within 10 m of, said lower end of the second run of downhole metallic pipe;

the repeater apparatus is disposed in the borehole at a level below the annulus defined by the first and second runs of downhole metallic pipe and within 100 m or, or more preferably within 10 m of, said lower end of the second run of downhole metallic pipe.

Especially where electrical signalling is used and the repeater apparatus is disposed in the annulus, the installation may further comprise an insulating centraliser provided in the annulus towards the lower end of the second run of downhole metallic pipe for holding the second run of downhole metallic pipe away from the first run of downhole metallic pipe and the repeater apparatus may be disposed in the annulus and arranged for at least one of picking up signals from the downhole metallic structure in the region of the insulating centraliser and applying signals to the downhole metallic structure in the region of the insulating centraliser.

According to another aspect of the invention there is provided a well installation comprising downhole metallic structure and downhole repeater apparatus for receiving signals and in response transmitting signals onwards, the repeater apparatus being arranged for at least one of receiving the signals by picking up electrical signals from the downhole metallic structure and transmitting the signals onwards by applying electrical signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe and the first run of downhole metallic pipe extending further into the borehole than the second run of downhole metallic pipe, such that the second run of downhole metallic pipe has a lower end past which the first run of downhole metallic pipe extends and the installation further comprises an insulating centraliser provided in the annulus towards the lower end of the second run of downhole metallic pipe for holding the second run of downhole metallic pipe away from the first run of downhole metallic pipe and the repeater apparatus is disposed in the annulus and arranged for at least one of picking up signals from the downhole metallic structure in the region of the insulating centraliser and applying signals to the downhole metallic structure in the region of the insulating centraliser.

This can lead to a well installation in which the repeater is disposed in a protected location within the second run of downhole metallic pipe whilst the inclusion of the insulating centraliser can facilitate effective electrical signalling via the downhole metallic structure.

The repeater apparatus or at least part of the repeater apparatus may be located in the region of the insulating centraliser.

The repeater may be installed into the well installation during a construction phase. This can be in situations where there is an intention to use the repeater at that stage or at later stages, or as a precaution in case it becomes useful. In this sense the well installation can be rendered a "wireless ready" well installation by installation of the repeater.

The repeater apparatus may comprise a repeater arrangement which arrangement may be mounted on a length of downhole metallic pipe before this is introduced into the borehole as part of one of the runs of downhole metallic pipe—The repeater apparatus may be considered to be completion conveyed repeater apparatus. The repeater arrangement may typically be mounted on downhole metallic pipe in the first run of downhole metallic pipe.

The insulating centraliser may preferably be disposed within 50 metres, more preferably still within 10 metres, of the lower end of the second run of downhole metallic pipe.

An insulating layer may be provided on an outer surface of the first run of downhole metallic pipe in the region of the lower end of the second run of downhole metallic pipe. An insulating layer may be provided on an outer surface of the first run of downhole metallic pipe over a length of say 10 or 50 metres beyond the lower end of the second run of downhole metallic pipe.

The insulating layer may comprise an insulating coating.

The repeater apparatus may comprise spaced contacts for mechanically and electrically contacting with one of the runs of downhole metallic pipe at spaced locations on the run of downhole metallic pipe for at least one of picking up signals from and applying signals to said one of the runs of downhole metallic pipe.

At least one of the contacts may comprise a plurality of high force spring centraliser units.

At least one of the contacts may be arranged to bite into the material of the downhole metallic pipe for enhancing electrical connection. At least one of the contacts may comprise teeth.

At least one of the contacts may be arranged as a setting means for gripping into the material of the downhole metallic pipe for holding the apparatus in position.

The repeater apparatus may comprise an inductive choke disposed around said one of the runs of downhole metallic pipe for generating electrical impedance in said one of the runs of downhole metallic pipe between said spaced locations to enhance at least one of the picking up of signals from and applying of signals to said one of the runs of downhole metallic pipe.

The repeater apparatus may comprise an inductive coupling disposed around one of the runs of downhole metallic pipe for at least one of picking up signals from and applying signals to said one of the runs of downhole metallic pipe.

The repeater apparatus may comprise a sleeve electrode arrangement comprising a conductive sleeve disposed around the first run of downhole metallic pipe arranged for electrical contact with the surroundings and an insulating layer disposed between the conductive sleeve and the first run of downhole metallic pipe for insulating the conductive sleeve therefrom.

The repeater apparatus may be arranged for at least one of picking up signals from and applying signals to said one of the runs of downhole metallic pipe via a first connection to the conductive sleeve and a second connection to the downhole metallic structure.

The repeater apparatus may comprise at least one of a transmitter, a receiver and a transceiver which is connected by a first connection to the conductive sleeve and by a second connection to the downhole metallic structure for at least one of picking up signals from and applying signals to said one of the runs of downhole metallic pipe.

The insulating layer may comprise a coating coated onto the surface of the downhole metallic pipe. The conductive sleeve may comprise a coating coated onto the insulating layer.

The sleeve electrode arrangement may comprise a sleeve body comprising the insulating layer and the conductive sleeve and which is introducible over the downhole pipe and clamped in position by at least one clamp.

According to another aspect of the invention there is provided a sleeve electrode arrangement for use in downhole communication apparatus, the sleeve electrode arrangement comprising a conductive sleeve to be disposed around downhole metallic pipe and arranged for electrical contact with the surroundings and an insulating layer to be disposed between the conductive sleeve and the downhole metallic pipe for insulating the conductive sleeve therefrom, wherein the sleeve electrode arrangement comprise a sleeve body comprising the insulating layer and the conductive sleeve and which sleeve body is introducible over the downhole pipe and clampable in position by at least one clamp.

According to yet another aspect of the invention there is provided downhole metallic pipe arrangement comprising a section of downhole metallic pipe and a sleeve electrode arrangement, for use in downhole communication apparatus, mounted on the section of downhole metallic pipe, the sleeve electrode arrangement comprising a conductive sleeve disposed around the downhole metallic pipe and arranged for electrical contact with the surroundings and an insulating layer disposed between the conductive sleeve and the downhole metallic pipe for insulating the conductive sleeve therefrom, wherein the sleeve electrode arrangement comprise a sleeve body comprising the insulating layer and the conductive sleeve and which sleeve body is introducible over the downhole pipe and clamped in position by at least one clamp.

According to yet another aspect of the invention there is provided a downhole communication apparatus, say repeater apparatus, comprising a downhole metallic pipe arrangement as defined above and at least one of a transmitter, a receiver and a transceiver which is connectable or connected by a first connection to the conductive sleeve and by a second connection to downhole metallic structure for at least one of picking up signals from and applying signals to the downhole metallic structure.

The second connection may be to the section of down hole metallic pipe.

According to yet another aspect of the invention there is provided a well installation comprising downhole communication apparatus as defined above and downhole metallic structure of which the section of downhole metallic pipe forms a part.

The longitudinal extent of the insulating layer may exceed the longitudinal extent of an exposed portion of the conductive sleeve at both ends of the conductive sleeve to reduce local shorting between the sleeve and the metallic structure.

The insulating layer may extend longitudinally beyond the extent of the conductive sleeve at both ends of an exposed portion of the conductive sleeve to reduce local shorting between the sleeve and the metallic structure.

The sleeve body may comprise a conductive main body portion to which an insulating layer, say insulating coating is applied, to yield the insulating layer and the conductive sleeve.

The sleeve body may comprise an insulating main body portion to which a conductive layer, say conductive coating is applied, to yield the insulating layer and the conductive sleeve.

The sleeve body may comprise an insulating main body portion and a conductive main body portion which are mounted one to the other to yield the insulating layer and the conductive sleeve.

The sleeve body may comprise a main portion in which there is an exposed surface of the conductive sleeve for electrical contact with the surroundings and two end portions into which the exposed surface of the conductive sleeve does not extend.

The sleeve body may comprise an electrically conductive main body which carries the insulation layer and carries further insulation portions at said end portions so as to insulate the electrically conductive main body from the surroundings at the end portions.

In such a case the insulation layer and/or the further insulation portions may comprise an insulating coating.

In an alternative the sleeve body may comprise an insulating main body which carries the conductive sleeve and is arranged so that insulation portions are provided at said end portions. As an example the conductive sleeve may be embedded in the insulating main body or coated onto the insulating main body at locations away from the end portions.

The sleeve body may be clampable/clamped to the downhole pipe by at least one and preferably two annular clamps.

The clamp or each clamp may be arranged to act on one of or respective ones of the end portions of the sleeve body.

The clamp or each clamp may be arranged to project radially further outward than the exposed surface of the conductive sleeve for protecting the conductive sleeve when the sleeve body is clamped on the downhole metallic pipe.

As will be appreciated where insulation/insulating is mentioned in this specification this is a reference to electrical insulation.

The downhole metallic structure may comprise a conductive device disposed in the annulus so as to electrically connect the first run of downhole metallic pipe with the second run of downhole metallic pipe.

The conductive device may be disposed in the annulus in the region of the repeater apparatus but further from the lower end of the second run of downhole metallic pipe than is the insulating centraliser.

The conductive device may comprise a conductive centraliser. The conductive device may comprise a plurality of conductive centralisers.

The conductive device may comprise an annular sealing device such as a packer.

The repeater apparatus may comprise a pair of contacts one contact in the pair for mechanically and electrically contacting with the first run of downhole metallic pipe and another contact in the pair for mechanically and electrically contacting with the second run of downhole metallic pipe for at least one of picking up signals from and applying signals to the downhole metallic structure. That is to say the repeater apparatus may be connected across the annulus. In such a case a second, auxiliary insulating centraliser may be provided in the annulus above the location of the repeater apparatus.

The repeater apparatus may comprise a battery pack for powering the repeater apparatus. The battery pack may be disposed in the annulus.

The battery pack may be disposed at a shallower location in the borehole than a location at which the repeater apparatus at least one of picks up signals from and applies signals to the downhole metallic structure.

This means that the battery pack may be disposed at a cooler location.

The battery pack may be connected via a cable to another portion of the repeater apparatus which at least one of picks up signals from and applies signals to the downhole metallic structure.

Electrical power, and optionally electrical signals, may be transmitted via said cable.

The well installation may comprise an annular sealing plug or device in said annulus at a level above the location at which the repeater apparatus at least one of picks up signals from and applies signals to the downhole metallic structure and the battery pack may be disposed in the annulus above the level of the sealing plug or device.

The cable from the battery pack may run through the annular sealing plug or device, alternatively the battery pack may be arranged for transmitting electrical power past the annular sealing plug or device via the metallic structure.

The repeater apparatus may comprise downhole power supply apparatus located in the annulus above the annular sealing plug or device and below plug apparatus below the annular sealing plug or device and including a module in the region where the repeater apparatus at least one of picks up signals from and applies signals to the downhole metallic structure. The power supply apparatus may comprise the battery pack with the downhole power supply apparatus and below plug apparatus being arranged for delivering electrical power from the downhole power supply apparatus to the module across the annular sealing plug or device.

The power supply apparatus may comprise a power transfer arrangement for applying electrical current to the downhole metallic pipe above the plug; and the below plug apparatus may comprise a power pick up arrangement for picking up electrical current from the downhole metallic pipe below the plug to power the module.

The below plug apparatus may further comprise a local battery that may be used in preference to the battery pack whilst charge is available in the local battery.

The repeater apparatus may comprise a harvesting device for harvesting electrical power from the downhole metallic structure. The well installation may comprise a cathodic protection system for applying cathodic protection currents to the downhole metallic structure. The harvesting device may be arranged for harvesting electrical power from the cathodic protection currents.

The well installation may comprise an electrical power source for applying electrical power current to the downhole metallic structure. The harvesting device may be arranged for harvesting electrical power from the electrical power currents. The electrical power currents may be distinct from cathodic protection currents. The electrical power currents may be AC currents.

The harvesting device may be arranged to harvest power from DC and/or AC currents.

In some embodiments the current flowing in the downhole metallic structure is supplied from the surface of the well.

In some embodiments the current flowing in the downhole metallic structure is supplied from one or more sacrificial anodes.

In some embodiments the current flowing in the downhole metallic structure is an impressed current from an external power supply.

The harvesting device may be electrically connected to the metallic structure at a first location and to the metallic structure at a second location spaced from the first location, the first and second locations being chosen such that, in use, there is a potential difference therebetween due to the electric current flowing in the structure; and the harvesting module being arranged to harvest electrical energy from the electric current.

The spaced locations may be axially spaced with contact being made to the same run of downhole metallic pipe. Where this spacing is relied upon for there to be a potential difference therebetween, the spacing between the locations is likely to be considerable—typically 100 m or more. More preferably 300 m to 500 m.

The electrical connection to the metallic structure at the first location may be a galvanic connection.

The electrical connection to the metallic structure at the second location may be a galvanic connection.

The harvesting device may be positioned within the annulus.

The connection to at least one of the first and second locations may be via a cable running alongside the metallic structure.

Preferably the electrical current flowing in the downhole metallic pipe where the first contact is made flows in the same longitudinal direction as the electrical current flowing in the downhole metallic pipe where the second contact is made.

Preferably if the first spaced contact and the second spaced contact are both made to the same run of downhole metallic pipe, that run of downhole metallic pipe is continuously conductive between the first and second locations.

At least one connection between the at least one of the electrical contacts and the harvesting device may be provided by an insulated cable.

The cable may be selected to have a conductor with a relatively large cross-sectional area. When selecting a cable the aim is to pick a cross-sectional area which is large enough to allow the desired level of harvesting—one which provides low enough resistance in the cable.

Preferably the insulated cable has a conductive area of at least 10 mm^2, preferably at least 20 mm^2, more preferably at least 80 mm^2.

The cable may be a tubing encapsulated conductor.

One of the connections may be made without an external cable. One of the connections may be made via a conductive housing of or surrounding the harvesting device.

Typically there will be an optimal spacing between the connections. The larger the spacing the greater the change in potential between the contact locations, but also the greater the resistance of the cable. An installation method may comprise determining an optimal spacing, between the spaced locations. This may be determined by modelling for a particular installation.

The spacing between the locations may be at least 100 m.

The harvesting device may comprise variable impedance means for varying the load seen between the two connections. The variable impedance means may be microprocessor controlled.

The variable impedance means may be used to vary the load so as to optimise energy harvesting.

The variable impedance means may be used to modulate the load so as to communicate data from the harvesting device towards the surface. As such the harvesting device may perform at least part of the repeating function of the repeater apparatus.

In some embodiments the repeater apparatus is arranged for using EM (Electro-Magnetic) signalling via the application of electrical signals to the metallic structure and/or the pick up of electrical signals from the metallic structure for at least a part of the signal channel. In such a case, in at least some circumstances, the repeater apparatus may be arranged to use other signalling techniques either for other parts of the signal channel or in parallel with EM signalling. Thus for example the repeater apparatus may be arranged to make use of acoustic signalling, direct cable signalling, other EM signalling etc as well as EM signalling which makes use of the downhole metallic structure. The EM signalling using metallic structure may be in different forms as well—different forms of modulation may be used—for example impedance or load modulation (where a reference signal is applied elsewhere and modulated at the signalling location), pulse position modulation, Frequency Shift Keying (FSK), etc, etc.

The repeater apparatus may comprise at least one of a transmitter, receiver or transceiver which is controllable under the control of a control unit for selective use of a modulation scheme selected from at least two available modulation schemes with which the at least one of a transmitter, receiver or transceiver can function. The repeater apparatus may comprise the control unit or the control unit may be remote therefrom. The control unit may be arranged to select the modulation scheme in dependence on predetermined conditions. Alternatively the modulation scheme may be selected based on human intervention. The modulation scheme may be selected based on or more of the following: the distance over which the signals are to be transmitted, the available power source type or level at the transmitting location and/or the receiving location, the capabilities of a receiving location, the importance of speed of reception of the data concerned and so on.

The well installation may further comprise a first communication unit for sending signals towards the repeater apparatus and a second communication unit for receiving signals from the repeater apparatus such that communication may take place between the first and second communication units via the repeater apparatus.

As will be appreciated different signalling techniques may be used between the first communication unit and the repeater apparatus on the one hand and between the second communication unit and the repeater apparatus on the other hand. Equally the same signalling techniques may be used in both of those legs.

There may be signalling in both directions between the communication units via the repeater apparatus.

One of the communication units may be downhole and the other may be downhole or out of hole, say at the surface.

The data to be communicated can of course be of any type, the data may for example comprise control signals and/or telemetry data—this may be say sensor readings from say temperature or pressure sensors, and/or say control signals to downhole devices, say valves.

The downhole metallic pipe may comprise at least one of casing, tubing, liner.

The repeater apparatus may comprise a connection module for at least one of picking up at least one of electrical and acoustic signals from the downhole metallic structure and applying at least one of electrical and acoustic signals to the downhole metallic structure. The connection module may be connected to a remainder of the repeater apparatus via a cable. The connection module may comprise for example, one or more of an inductive coupling, spaced mechanical and electrical contacts for applying/picking up electrical signals, a transducer for applying/picking up acoustic signals, a sleeve electrode module, a transceiver/transmitter/receiver.

In such a case the connection module might disposed at a level below the annulus whilst other parts of, or the remainder of, the repeater apparatus is disposed in the annulus.

In general terms the repeater apparatus, or at least the connection module, may be disposed in accordance with at least one of the following:

the repeater apparatus or at least the connection module may be disposed within the annulus defined by the first and second runs of downhole metallic pipe and within 100 m of, or more preferably within 10 m of, said lower end of the second run of downhole metallic pipe;

the repeater apparatus or at least the connection module may be disposed in the borehole at a level below the annulus defined by the first and second runs of downhole metallic pipe and within 100 m or, or more preferably within 10 m of, said lower end of the second run of downhole metallic pipe;

the repeater apparatus or at least the connection module may be disposed in the borehole at a level below a point 500 m above the lower end of the second run of downhole metallic pipe;

the repeater apparatus or at least the connection module may be disposed in the borehole at a level below the lower end of the second run of downhole metallic pipe.

According to yet a further aspect of the invention there is provided a well installation communication method for use in a well installation comprising downhole metallic structure, the method comprising providing downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe.

According to yet another aspect of the invention there is provided a wireless communication enabled well installation construction method, the well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the method comprises installing downhole metallic structure which comprises first and second runs of downhole metallic pipe provided in a borehole, the first run of downhole metallic pipe being provided within the second run of downhole metallic pipe so as to define an annulus between the first and second runs of downhole metallic pipe;

installing the repeater apparatus into the well installation during a construction phase.

The repeater apparatus may comprise a repeater arrangement which arrangement is mounted on a length of downhole metallic pipe before this is introduced into the borehole as part of one of the runs of downhole metallic pipe.

The method may comprise performing the above steps in a situation where no communications equipment is provided in the well installation for making use of the repeater apparatus at the time when the well construction is completed, but rather the repeater apparatus is installed to provide a communications backbone for future use.

The method may comprise performing the steps of said yet another aspect of the invention at a first time, and at a later time at least one year after said first time, installing communications equipment in the well installation for making use of the repeater apparatus, preferably with there having been no use made of the repeater apparatus in the intervening period.

The method may comprise installing a first set of communications equipment in the well installation for making use of the repeater apparatus at one time and then at a later time at least one year said one time, installing a second set of communications equipment in the well installation for making use of the repeater apparatus.

According to another aspect of the invention there is provided a communication signal repeater method for use in a well installation comprising downhole metallic structure and downhole repeater apparatus for receiving signals and in response transmitting signals onwards, the repeater apparatus being arranged for at least one of receiving the signals by picking up electrical signals from the downhole metallic structure and transmitting the signals onwards by applying electrical signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe and the first run of downhole metallic pipe extending further into the borehole than the second run of downhole metallic pipe, such that the second run of downhole metallic pipe has a lower end past which the first run of downhole metallic pipe extends and the method comprises:

providing an insulating centraliser in the annulus towards the lower end of the second run of downhole metallic pipe for holding the second run of downhole metallic pipe away from the first run of downhole metallic pipe; disposing the repeater apparatus in the annulus; and using the repeater apparatus to at least one of pick up electrical signals from the downhole metallic structure in the region of the insulating centraliser and apply electrical signals to the downhole metallic structure in the region of the insulating centraliser.

Note that in general each of the optional features following each of the aspects of the invention above is equally applicable as an optional feature in respect of each of the other aspects of the invention and could be re-written after each aspect with any necessary changes in wording. Not all such optional features are re-written after each aspect merely in the interests of brevity.

Embodiments of the present invention will now be described, by way of example only, with reference to the accompanying drawings in which.

Figure 1:
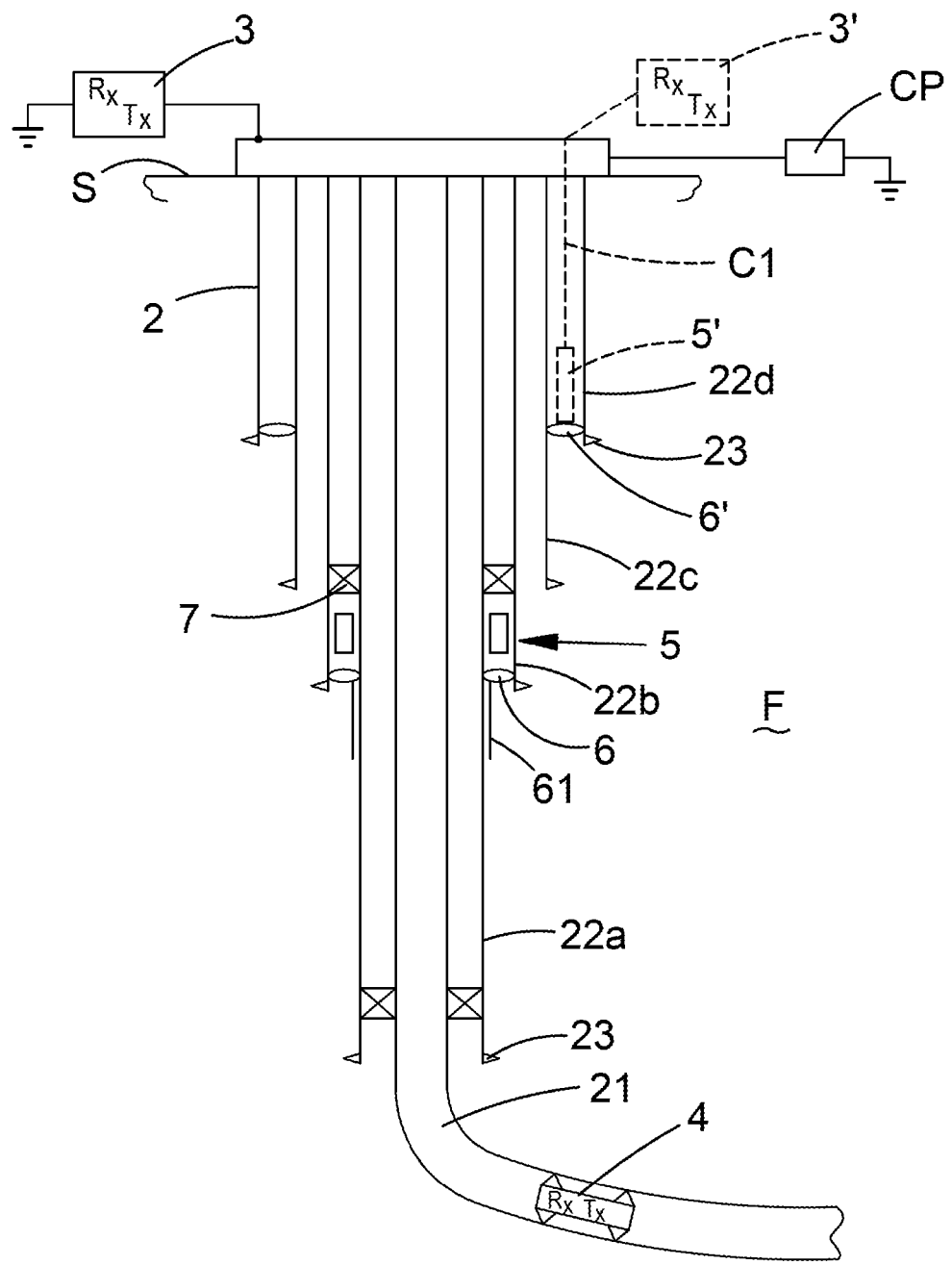
FIG. 1 shows a well installation including a communication system having repeater apparatus.

FIG. 1 shows an oil and/or gas well installation comprising a well head 1 provided at the surface S and downhole metallic structure 2 projecting down into the borehole of the well drilled in the formation F. The downhole metallic structure comprises production tubing 21 surrounded by (in this embodiment) four runs of casing 22*a*, 22*b*, 22*c* and 22*d*. As is common in a well installation these runs of casing 22*a*-22*d* extend to different depths within the borehole and each terminates at a respective shoe 23. Annuli are formed between the respective runs. According to convention the innermost annulus is termed the 'A' annulus, the next one the 'B' annulus, the next the 'C' annulus and so on.

The well installation also comprises a communication system which in this embodiment comprises a topside communication unit 3, a downhole communication unit 4 and repeater apparatus 5.

The well installation also includes an impressed current cathodic protection system CP.

In the present specification it is the arrangement of and operation of the repeater apparatus 5 which is of particular interest.

The topside communication unit 3 in this embodiment is connected on the one hand to the well head 1 and on the other hand to a remote earth and is arranged for applying EM data communication signals to the metallic structure 1, 2 so as to send data from the topside unit 3 towards the downhole communication unit 4. Further the topside unit 3 is arranged for receiving data communication signals from the downhole communication unit 4 by virtue of picking up EM signals via its connection to the well head 1 and its remote earth.

Similarly the downhole communication tool 4 is arranged for applying data carrying EM signals to the downhole metallic structure 2, in particular the production tubing 21 in this instance, and picking up EM communication signals from the downhole metallic structure, in this case the production tubing 21.

Thus, in this instance there is bi-directional communication between the topside communication unit 3 and downhole communication unit 4. The data transmitted between these two units can be of any kind required. For example, control signals may be transmitted from the topside unit 3 to the downhole communication unit 4 and for example telemetry data such as pressure and/or temperature measurements may be communicated from the downhole communications tool 4 back towards the topside unit 3.

Whilst in principal the topside communication unit 3 could communicate with the downhole communication unit 4 without any components or assistance therebetween just by virtue of the signals progressing along the downhole metallic structure and appearing at the well head 1, as will be appreciated in practice it can be useful to provide repeater apparatus 5 as is provided in this example for receiving the signals from the downhole metallic structure 2 and reapplying these to help receipt at the respected receiving unit 3, 4.

Further in some cases a different form of communication might be used on different legs of the communication path. That is to say whereas in the above described example the same EM communication signals are used along the whole of the signal channel between the downhole communication unit 4 and the topside communication unit 3 in other cases the repeater apparatus 5 may be designed for accepting signals of one type from one of the communication units and transmitting the signals onwards using a different communication technique. Thus for example in some instances EM signals might be used between the downhole communication unit 4 and the repeater apparatus 5 and a different form of communication, say acoustic communication, used between the repeater apparatus 5 and the topside unit 3.

In other alternatives a system may be provided with acoustic communication as the primary technique and possibly no EM signalling.

Further it will be realised that the two communication units 3, 4 need not be located as shown in the above example. Both communication units for example might be located downhole, say in different bores in a multilateral well.

In yet another alternative a repeater apparatus 5' may be connected via a direct cable connection C1 to a topside unit 3', such an arrangement is shown in doted lines in FIG. 1. Here this alternative repeater apparatus 5' is provided in an outer annulus, in this case the "D annulus", and relatively near the surface. In this case the repeater unit 5' is arranged for picking up EM signals from the downhole metallic structure, in particular the third casing 22c and/or fourth casing 22d, and transmitting the signals onwards toward the topside unit 3' along its cable C1 again shown in dotted lines. Of course this arrangement may also be used for communicating in the opposite direction as well. Again in such a case such a repeater apparatus might be arranged for acoustic signalling as well as or instead of EM signalling. The topside unit 3' may be arranged for providing power to the repeater apparatus 5'. In such a case impedance modulation might be used for signalling back towards the topside unit 3' from the repeater apparatus. That is to say the repeater apparatus 5' may comprise variable impedance means (not shown) for varying the impedance introduced into the signal circuit including said cable to encode data, and the topside unit 3' may be arranged to extract said data by monitoring variations in the voltage and/or current seen at the topside unit 3' caused by the variable impedance means. The voltage and/or current across the power supply at the topside unit 3' used to supply power to the repeater apparatus 5' might be monitored in carrying this out.

As well as the repeater apparatus 5, 5', the well installation comprises an insulating centraliser 6, 6' which is provided in the same annulus as the repeater apparatus 5, 5' and is provided at the region of the repeater apparatus 5, 5'. Furthermore, both the repeater apparatus 5 and the insulating centraliser 6 are provided at a region towards the end of the second casing 22b but notably with the repeater apparatus 5 located in the annulus (the "B annulus") within the second casing 22b so as to be protected from the environment outside of the annulus and better protected from potential damage. The provision of the insulating centraliser 6 in the region of the repeater apparatus 5 helps allow affective pickup and/or application of EM signals to the downhole metallic structure 2 at the repeater apparatus 5. The same considerations above and below apply for the alternative repeater apparatus 5'. Note these considerations would not apply if acoustic signalling were used.

An insulting layer, which may be a coating, 61 may also be provided on the outside of the downhole metallic pipe in the region of the repeater apparatus 5, that is to say on the inner wall of the annulus in which the repeater apparatus 5 is disposed. Thus in this case the insulating layer 61 is provided to the outer surface of the first casing 22a at this region. This can help ensure that no good electrical connection is made between the end of the second run of casing 22b and the first run of casing 22a in the region of the repeater apparatus 5 should the location of the insulating centraliser 6 be less that optimal. That is to say if the second run of casing 22b extends further than is desirable beyond the location of the insulating centraliser 6 such that there may be sufficient length to cause a glancing contact between the first run of casing 22a and the second run of casing 22b.

Preferably the insulating centraliser 6 is no more than 50 metres from the end of the second run of casing 22b and more preferably no more than 10 metres from the end of the second run of casing 22b. The insulating layer 61 may be provided on the first run of casing 22a over a length of 10 metres or more preferably 50 metres beyond the location at which the second run of casing is expected to end.

It should be noted that the insulating layer 61, the insulating centraliser 6 and the repeater apparatus 5 will typically be provided on the downhole metallic structure as it is installed. To put this in another way these components are typically completion conveyed. This means that their location in relation to the end of the second run of casing 22b needs to be calculated prior to installation. Further as will be appreciated the precise end of the second run of casing 22b will only be accurate within a certain tolerance. The inclusion of the insulating layer 61 can help to ensure effective operation if the position is further out than expected.

In the present installation as shown in FIG. 1 an annular sealing device, in particular, a packer 7 is provided in the annulus in which the repeater apparatus 5 is disposed. This packer 7 serves to electrically connect the first casing 22a to the second casing 22b at the location of the packer 7. Even if this packer 7 were not present then at some location above the repeater apparatus 5 in practical circumstances there would be electrical connection between the first casing 22a and the second casing 22b due to a glancing contact or another conductive component being present in the downhole metallic structure or at the well head 1. Such a component might, for example, be a conductive centraliser and this might be deliberately installed at a known location to give certainty over where the contact occurs.

With this overall arrangement the repeater apparatus 5 (and the alternative repeater apparatus 5') are located at a protected location and the provision of the insulating centraliser 6 allows affective EM transmission and/or reception.

Different implementations may be used for the repeater apparatus 5 in particular in terms of its application of electrical signals to the metallic structure and/or its pickup of electrical signals from the metallic structure.

Figure 2:
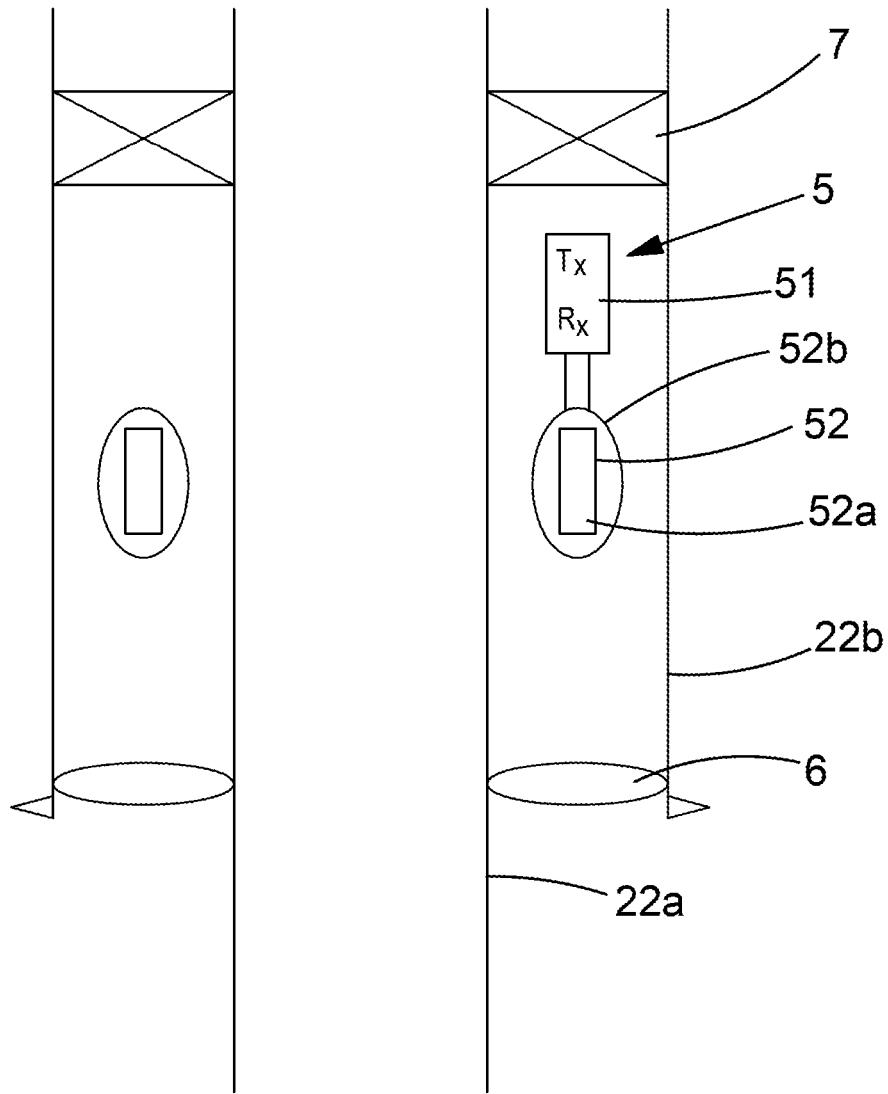
FIG. 2 shows part of a repeater apparatus which may be used in a well installation of the type shown in FIG. 1.

FIG. 2 shows a first possible implementation of the repeater apparatus 5. In this case the repeater apparatus 5 comprises a transceiver 51 which is inductively coupled to the downhole metallic structure, in particular the first casing 22a, via a toroidal inductive coupling 52. The toroidal inductive coupling 52 comprises a generally toroidal piece of magnetic material 52a which surrounds the first casing 22a and a winding 52b wound on the piece of toroidal material 52a. The repeater apparatus 5 may further comprise a battery pack (not shown) comprising a relatively large number of batteries if desired. All of these components may be located in this annulus. Electrical data carrying signals may be applied to and/or picked up from the first casing 22a via the inductive coupling 52. In a case where the coupling 52 is only used for one of applying and picking up the signals then another mechanism may be used for the other part of the repeating process.

Figure 3:
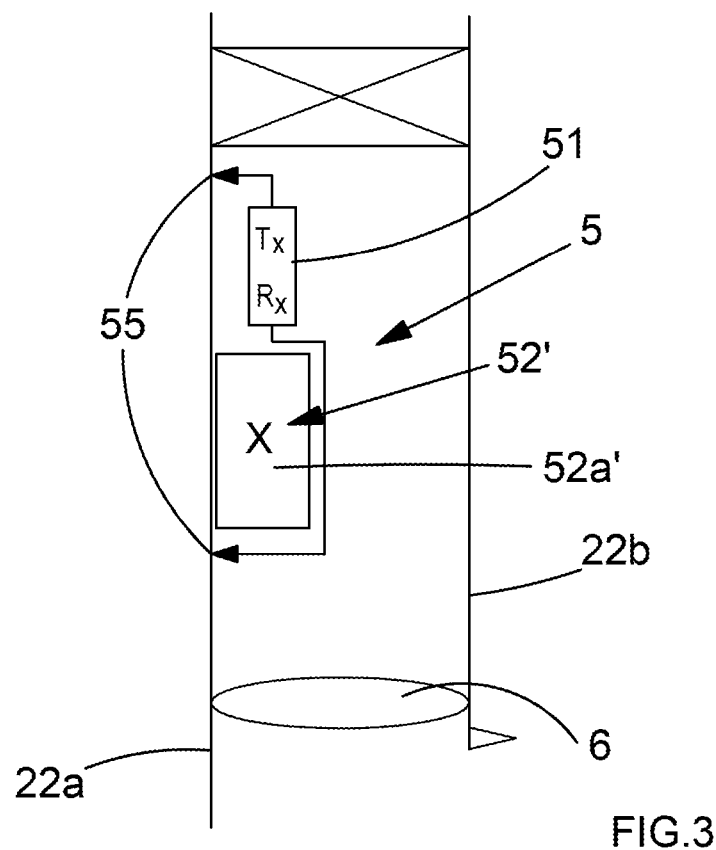
FIG. 3 shows an alternative repeater apparatus which may be used in a well installation of the type shown in FIG. 1.

FIG. 3 shows an alternative implementation for the repeater apparatus 5. Here again a piece of toroidal magnetic material 52a' is provided around the second casing 22b but in this case this is provided as an inductive choke 52', for generating electrical impedance in the downhole metallic structure at its region and in particular in the second casing 22b running within it. Here the transceiver 51 of the repeater apparatus 5 is connected across this impedance by virtue of being connected via spaced contacts 55 to the downhole metallic structure and in particular the outside wall of the second casing 22b. Here signals are picked up by and applied by the transceiver 51 across this impedance. The inductive choke 52' may be tuned (or arranged to be adaptively tuneable) so as to generate high impedance at the same frequency/frequencies used for signalling to maximise its effectiveness.

It will be appreciated that with both this direct contact type of implementation and the inductive coupling implementation shown and described above in relation to FIG. 2, the non-conductive centraliser 6 is important for ensuring there is not a local short circuit which would serve to significantly attenuate incoming and/or outgoing signals.

Figure 4:
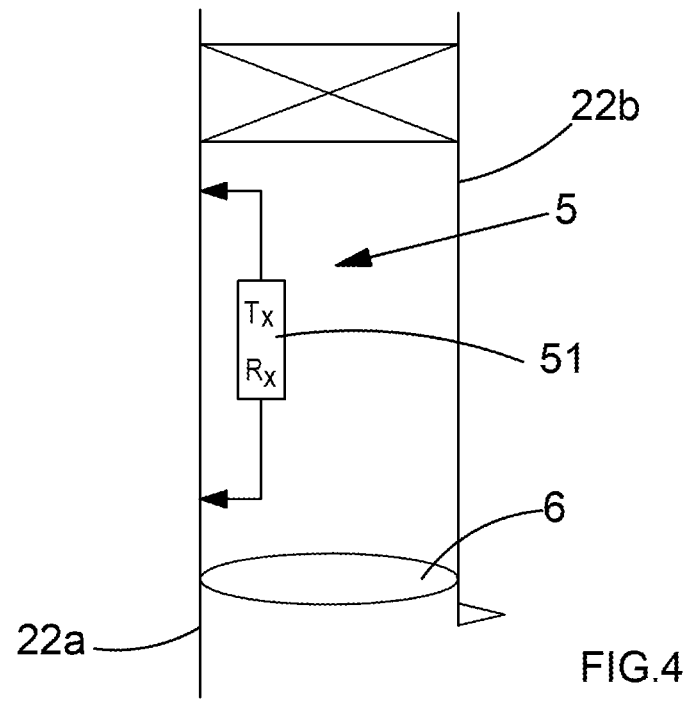
FIG. 4 shows yet another repeater apparatus which may be used in a well installation of the type shown in FIG. 1.

FIG. 4 shows a repeater apparatus 5 implementation which is similar to that shown in FIG. 3 except that the inductive choke 52' is omitted. Here signals are being picked up by spaced contacts 55 merely across the impedance of the metallic structure itself. Thus here it is helpful if there is a significant axial spacing between the spaced contacts 55—say 100 metres or more. In each case above the spaced contacts 55 may be provided in the form of a plurality of high force spring centralisers. In at least some cases the centralisers may be provided with teeth for biting into the surface of the metallic structure to improve mechanical and electrical connection.

Figure 5:
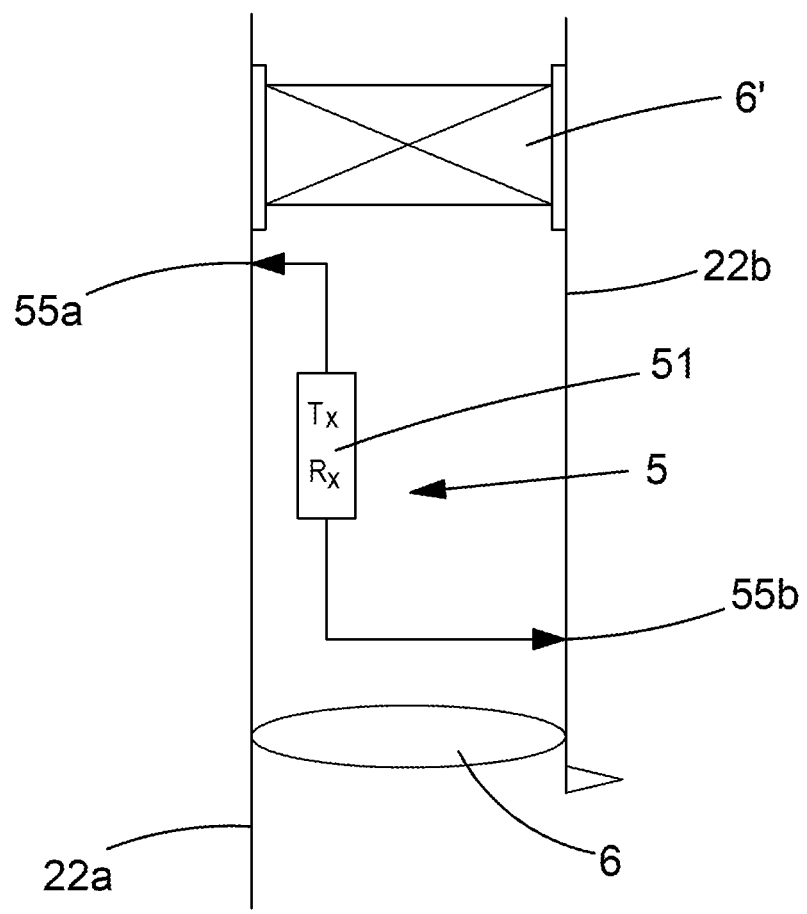
FIG. 5 shows a further repeater apparatus which may be used in a well installation of the type shown in FIG. 1.

FIG. 5 shows another alternative implementation of the repeater apparatus 5. Here the transceiver 51 of the repeater apparatus 5 is connected across the annulus. That is to say it is connected via spaced contacts 55 with one contact 55a contacting with the inner wall of the annulus in which it is located and the other contact 55b contacting with the outer wall of the annulus in which it is located. Thus with the location of the repeater apparatus 5 shown in FIG. 1 one contact 55a is to the outer wall of the first casing 22a and the other contact is to the inner wall of the second casing 22b. In this case in order to achieve good performance it is important that there is a significant length of both runs of these metallic pipes (ie that forming the outer wall and the inner wall of the annulus) where there is no electrical connection therebetween. Thus in this case it is desirable if there is a second insulating centraliser 6' of some form in the annulus above the location of the repeater apparatus 5 and first insulating centraliser 6. FIG. 5 shows an insulated centraliser 6' in the form of a packer which is insulated from the downhole metallic structure at its radially inner and radially outer extents.

Figure 6:
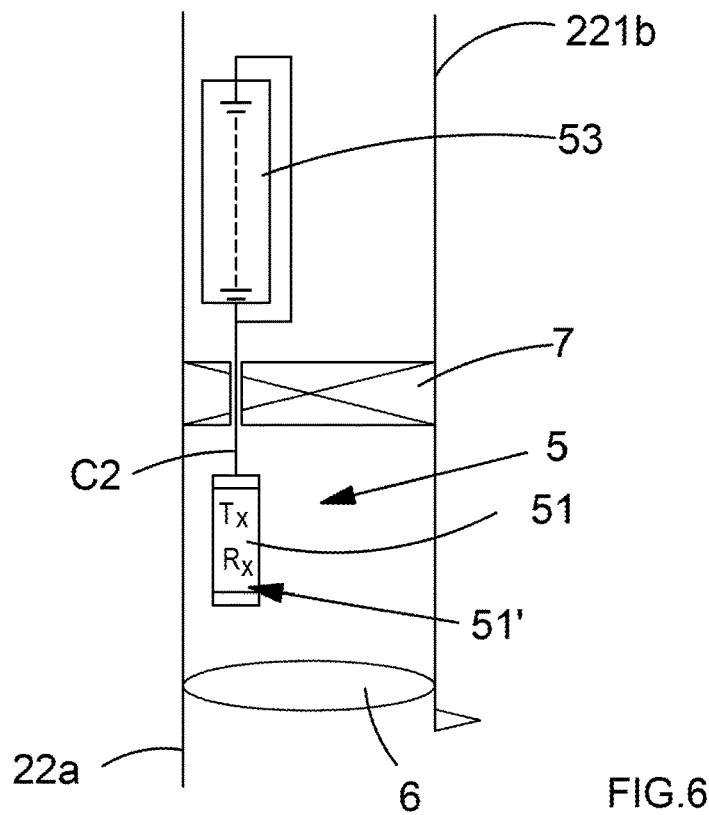
FIG. 6 shows yet another repeater apparatus which may be used in a well installation of the type shown in FIG. 1.

FIG. 6 shows yet another implementation of the repeater apparatus 5. Here the repeater apparatus 5 comprises a transceiver 51 as part of one module 51'. This transceiver 51 may be connected to downhole metallic structure and operate as any of the transceivers 51 described above in relation to FIGS. 2 to 5. What is of interest in this repeater apparatus 5 is that as well as the module including the transceiver 51, the repeater apparatus 5 comprises a second module 53 which is spaced from the first module 51'. The second module 53 comprises a battery pack for powering the first module 51' and in particular for providing the power necessary for picking up and/or applying the signals to the metallic structure. This second module 53 including the battery pack may be located at a location in the well which is cooler than that at which the first module 51' is disposed. Generally speaking this means that the battery pack may be located at a shallower location in the well.

By locating the battery pack 53 at a cooler location then a longer battery life can be expected due to reduced dissipation effects. Here then power from the battery pack in the second module 53 is provided to the first module 51' via a cable C2. In this embodiment this cable C2 runs through an annular sealing device 7 provided in the annulus in which the repeater apparatus 5 is located. In other cases there may be no such annular sealing device between the two modules 51', 53. The cable C2 may be 100 metres or several hundred metres long in order to obtain a useful temperature differential between the location of the battery pack module 53 and the transceiver module 51'.

In another version of the system implemented along the lines shown in FIG. 6, rather than connection via a cable between the battery pack module 53 and the transceiver module 51' there may be communication of power via the metallic structure itself. Thus the battery pack module 53 may be arranged for applying electrical power signals to the metallic structure (ie say the wall of the first casing 22a and second casing 22b) and the transceiver module 51' may be arranged for picking up electrical power from the metallic structure (say the wall of the first casing 22a and second casing 22b) at a location below the annular sealing device 7. In such a case, power may be transmitted without a cable penetrating the annular sealing device 7. For this to be worthwhile the greater battery life that may be obtained by locating the battery pack module 53 at a lower temperature location must be sufficient that the losses inherent in transmitting power through the metallic structure can be tolerated. In some circumstances this may be the case.

Note that the transceiver module 51' in such embodiments may have a local battery for initial use and power from the battery pack module 53 may only be used once the local battery has been expended. This type of arrangement may be useful where it is required to first of all take quite a large number of regular readings which may be carried out using the power of the local battery and then a number of less frequent readings where power may be provided from the battery pack module 53. This is then relying on the fact that whilst the power transmission from the battery pack is inefficient, power needs only to be transmitted occasionally for infrequent readings. Further it is relying on the fact that energy can be expected to be retained by the battery pack over an extended period relatively effectively since the battery pack is located at a lower temperature location.

In an alternative rather than having a transceiver module 51' which is located at a higher temperature zone, the transceiver module 51' may also be located at the lower temperature zone of the battery pack and merely the necessary connections to the downhole metallic structure may be disposed at the higher temperature zone (say spaced contacts or an inductive coupling). That is to say in some circumstances the electrical connection to the downhole metallic structure for picking up and/or applying signals may be made at a first desired location in the region of the insulating centraliser 6 and a remainder of (or at least desired parts of) the downhole repeater apparatus may be located at a shallower location where the temperature is lower. In this way battery life may be extended and also electronic components in the transceiver module may be protected from the higher temperature.

Figure 7:
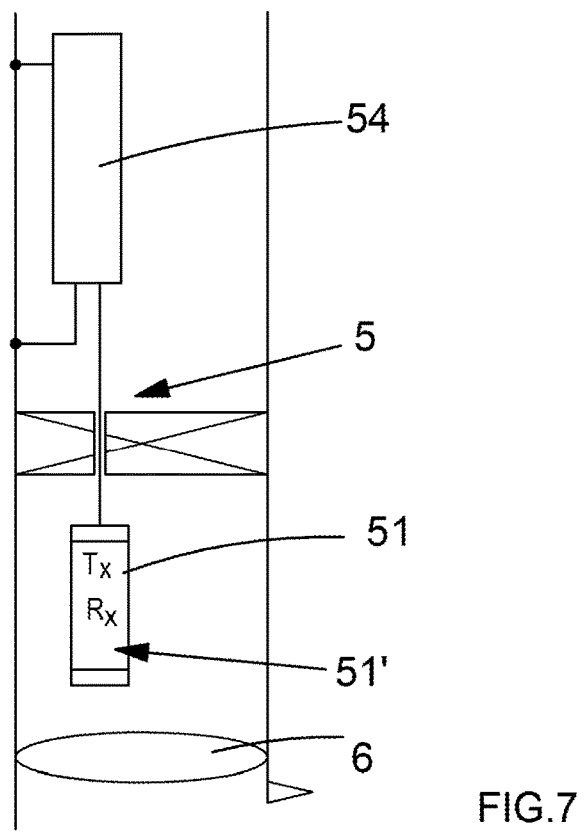
FIG. 7 shows a further repeater apparatus which may be used in a well installation of the type shown in FIG. 1.

FIG. 7 shows yet another implementation of the repeater apparatus 5. Here again the repeater apparatus 5 comprises a transceiver module 51' including a transceiver 51 which may be arranged for the application of and/or the pickup of signals from the metallic structure in the same way as shown in any one of FIGS. 2 to 5. In this case the repeater apparatus 5 also comprises a harvesting unit 54 for harvesting electrical power from the downhole metallic structure. In particular the harvesting unit 54 has connections to the metallic structure, in this instance the first casing 22a, and is arranged to harvest electrical power from currents flowing in the metallic structure 2. The harvesting unit 54 may either be arranged for harvesting electrical power from cathodic protection currents where the well installation includes a cathodic protection system (based on the provision of sacrificial anodes or by the application of impressed current—as included in the example installation of FIG. 1) or may be arranged for harvesting electrical power from currents otherwise applied to the downhole metallic structure. For example currents may be deliberately applied to the downhole metallic structure for the purpose of allowing the harvesting unit 54 to harvest electrical power. The harvesting unit 54 may be arranged to harvest electrical power from DC and/or AC currents as appropriate.

The electrical power harvested may then be fed to the transceiver module 51. If desired the ideas of the embodiment shown in and described with reference to FIG. 6 may be used together with the ideas of the embodiment shown in and described with reference to FIG. 7. That is to say, for example, a system may be implemented where there is both a battery pack provided at a cooler zone for maximising battery life and also a harvesting unit 54 of the type described with respect of FIG. 7. In such a case the repeater apparatus may be arranged to first use a local battery where this is available, second use the remote battery pack 53 and third, when this power is expended, make use of the harvesting unit 54 for providing power.

In this way an extremely long life repeater apparatus may be provided in the well.

In some cases the system may make use of modulating the load presented by the harvesting unit 54 for signalling. That is to say the repeater apparatus 5 may comprise means to modulate that load so as to encode data which can be detected at the receiving location by virtue of detecting resulting variations in the current drawn and/or potential different seen at the remote location. This can help reduce the power requirements for signalling at the repeater.

It should be noted that it is envisaged that the repeater apparatus 5 would be installed in a well installation during a construction phase. The repeater apparatus 5 may remain in situ for a relatively long time even if it is not used at an initial stage. This can allow the provision of a wireless ready well installation or a communications backbone which can be used at a later time. Bearing this in mind it is particularly useful to provide the repeater apparatus 5 with a source of power which has longevity. Thus, for example, the inclusion of a remote battery pack and/or a harvesting unit as described above in relation to FIGS. 5, 6 and 7 can be particularly useful.

Alternatively, another form of energy harvesting might be used or direct power from the surface may be used where this is possible. This may be where the repeater apparatus is located in an annulus at a relatively shallow location and/or in an annulus where it is possible to introduce a direct cable connection from the surface.

In any of the above examples the repeater apparatus, and in particular the transceiver module may be arranged to allow the selectable use of different communication techniques and/or modulation schemes. For example the transceiver may be arranged to use schemes that require better signal to noise ratio where the transmitting and/or receiving location are closer to the repeater than if the transmitting and/or receiving locations are further away. Further schemes may be chosen depending on the data rates needed. Thus if low amounts of data need to be communicated and a long time is available a less dense scheme may be used—say pulse position modulation (PPM)—this may also use less energy and allow larger range. If more information needs to be transmitted, more quickly, and if range and power allow, a more dense scheme (ie one design to achieve a higher data rate) such as frequency shift keying (FSK) may be used. Control over the use of modulation schemes may come from a remote control unit, say at the surface, or may be determined by a control unit in the apparatus itself. In one example the repeater apparatus may use FSK modulation for communication with the downhole unit 4 when this is close to the repeater and switch PPM modulation when the downhole unit 4 is significantly further downhole. This might be relevant where the downhole unit 4 is moveable, and/or if there are a plurality of such units, each at different respective locations. In this example the repeater might use PPM modulation at all times for communication with the topside unit 3. Switching between modes might be driven by factors such as received signal strength/signal to noise ratio, or time based, or location based information.

Whilst the above description has been written mainly in respect of installations including repeater apparatus which makes use of EM communication for at least one part of the communication channel, as alluded to above, this is not essential. Many of the ideas above are also applicable where the repeater apparatus is arranged to operate using acoustic communication for at least one leg, and may have no EM communication abilities in at least some cases. Where the repeater apparatus is not to use EM communication then the provision of an insulating centraliser becomes of less interest, and possibly completely redundant. Similarly as will be appreciated EM signalling may be operated without the use of an insulating centraliser even though this may lead to diminished performance if the centraliser is provided within the annulus.

Similarly whilst the above description has been written mainly in respect of installations including repeater apparatus disposed within the annulus, as alluded to above, this is not essential. Many of the ideas above are also applicable where the repeater apparatus is disposed outside of the annulus. In such a case the repeater apparatus may again be arranged to operate using acoustic communications and/or EM communications.

As alluded to above the provision of a remote power arrangement is of assistance in providing long term operation of the repeater apparatus and hence provision of wireless ready installation where the repeater apparatus is ready and waiting but might be first used a long time after its initial installation.

Figure 8:
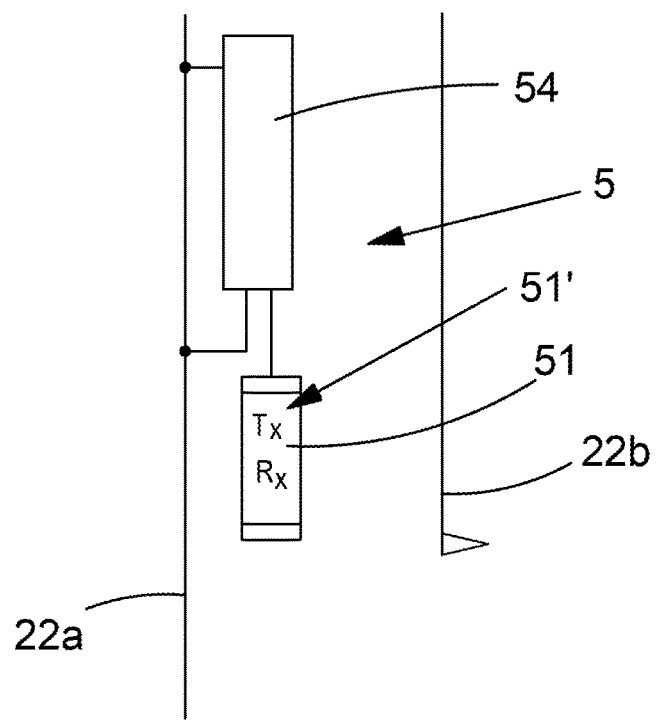
FIG. 8 shows a repeater apparatus which may be used in a well installation similar to the type shown in FIG. 1.

FIG. 8 shows another implementation of the repeater apparatus 5, here this is installed in a well installation that is similar to that shown in FIG. 1 but the insulating centraliser is omitted. The repeater apparatus 5 of FIG. 8 is arranged for acoustic communications rather than EM communications and thus the insulating centraliser is not particularly useful. Otherwise the implementation shown in FIG. 8 is similar to that shown in FIG. 7, in that the repeater apparatus 5 comprises a transceiver module 51' including a transceiver 51 which may be arranged for the application of and/or the pickup of acoustic signals from the metallic structure. Further again in this case the repeater apparatus 5 also comprises a harvesting unit 54 for harvesting electrical power from the downhole metallic structure. In particular the harvesting unit 54 has connections to the metallic structure, in this instance the first casing 22a, and is arranged to harvest electrical power from currents from flowing in the metallic structure 2. This harvesting unit is arranged to function in the same way as described above in relation to FIG. 7 and the same features and optional features are relevant.

Figure 9:
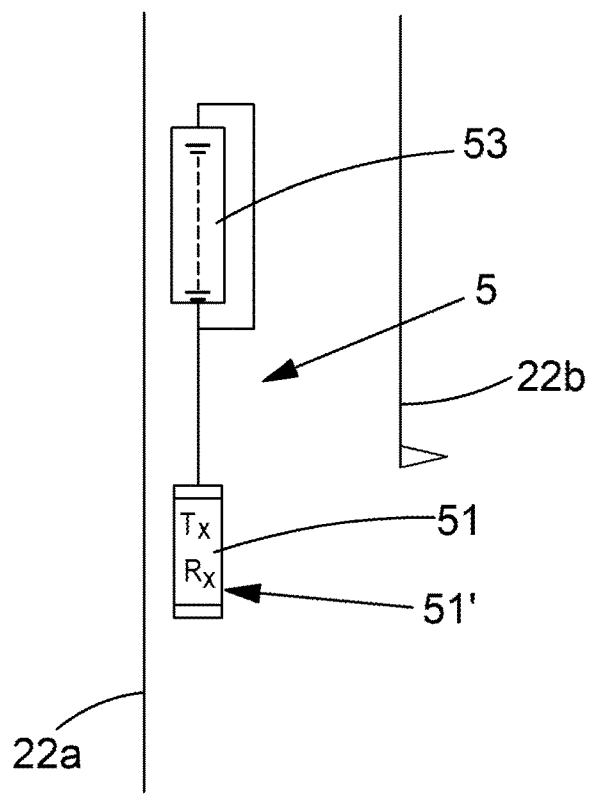
FIG. 9 shows another repeater apparatus which may be used in a well installation similar to the type shown in FIG. 1.

FIG. 9 shows another implementation of the repeater apparatus 5, here this is installed in a well installation that is similar to that shown in FIG. 1 but the insulating centraliser is omitted. The repeater apparatus 5 of FIG. 9 is arranged for acoustic communications and/or EM communications. However the part of the repeater apparatus used to apply signals to and/or pick up signals from the metallic structure is disposed outside of the annulus and thus the insulating centraliser is not particularly useful. Nevertheless the repeater apparatus 5 is protected by the presence of the second casing 22b since the repeater apparatus is located proximate the lower end of the second casing 22b—"in the region of the lower end". Even those portions outside the annulus tend to be protected because the cement cementing in the first casing 22a (ie the next run of metallic pipe inwards) will tend not to reach up to this region and proximity to the lower end of the second casing will tend to guard against impacts against the formation or other objects during installation.

Otherwise the implementation shown in FIG. 9 is similar to that shown in FIG. 6, again the repeater apparatus 5 comprises a transceiver 51 as part of one module 51'. This transceiver 51 may be connected to downhole metallic structure and operate as any of the transceivers 51 described above in relation to FIGS. 2 to 5 and/or operate using acoustic techniques. Again of interest in this repeater apparatus 5 is that as well as the module including the transceiver 51, the repeater apparatus 5 comprises a second module 53 which is spaced from the first module 51'. The second module 53 comprises a battery pack for powering the first module 51' and in particular for providing the power necessary for picking up and/or applying the signals to the metallic structure. This second module 53 including the battery pack may be located at a location in the well which is cooler than that at which the first module 51' is disposed. Generally speaking this means that the battery pack may be located at a shallower location in the well.

This remote power set up is arranged to function in the same way as described above in relation to FIG. 6 and the same features and optional features are relevant.

The first module 51' of the repeater apparatus may be disposed within say 100 m or preferably 10 m of the lower end of the second casing 22b.

Figure 10:
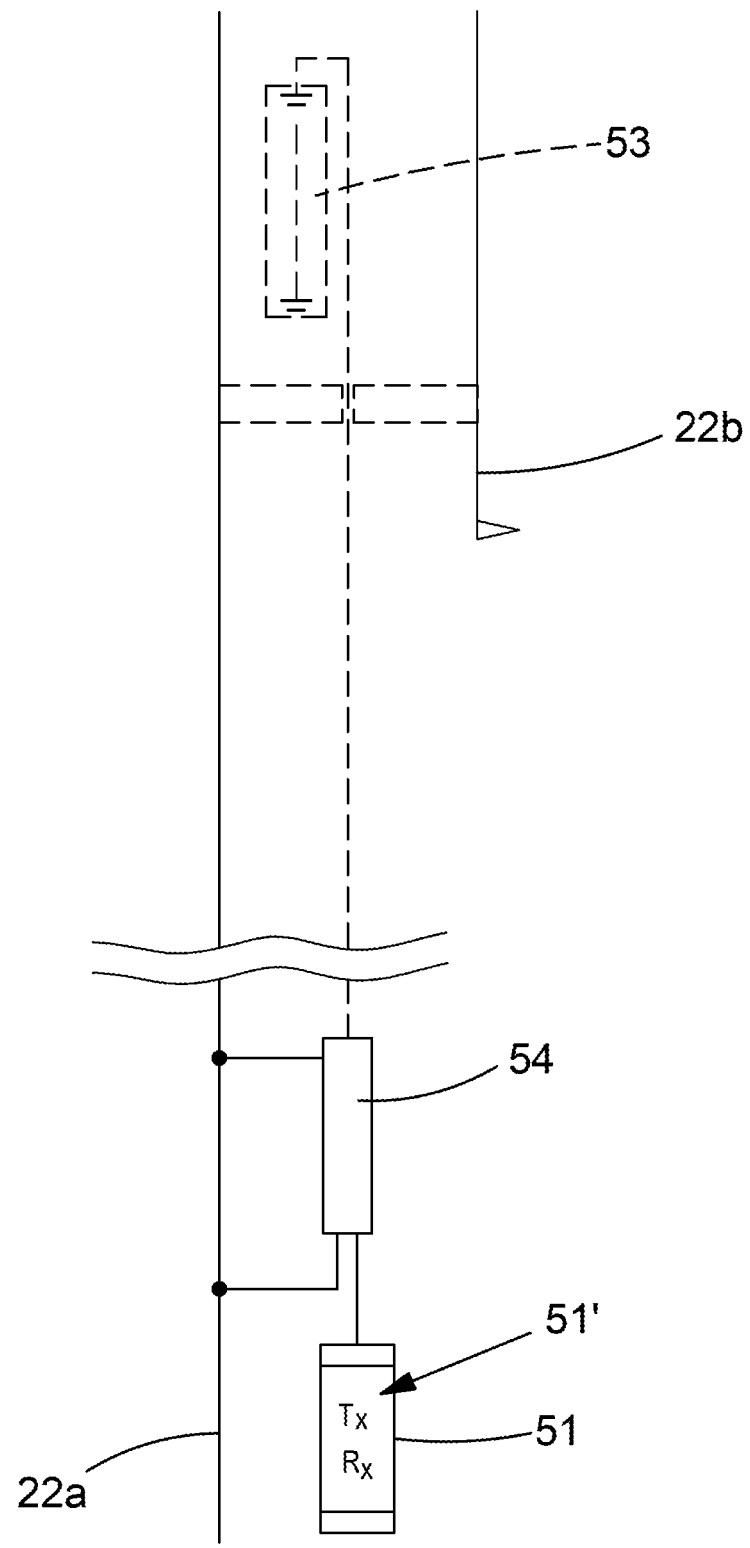
FIG. 10 shows a yet another repeater apparatus which may be used in a well installation similar to the type shown in FIG. 1.

FIG. 10 shows another implementation of the repeater apparatus 5, here this is installed in a well installation that is similar to that shown in FIG. 1 but the insulating centraliser is omitted. The repeater apparatus 5 of FIG. 10 is arranged for acoustic communications and/or EM communications. However at least the part of the repeater apparatus used to apply signals to and/or pick up signals from the metallic structure is disposed outside of the annulus and thus the insulating centraliser is not particularly useful.

In this case the repeater apparatus 5 again comprises a transceiver module 51' including a transceiver 51 which may be arranged for the application of and/or the pickup of electrical and/or acoustic signals from the metallic structure. Further again in this case the repeater apparatus 5 also comprises a harvesting unit 54 for harvesting electrical power from the downhole metallic structure. In particular the harvesting unit 54 has connections to the metallic structure, in this instance the first casing 22a, and is arranged to harvest electrical power from currents from flowing in the metallic structure 2. This harvesting unit is arranged to function in the same way as described above in relation to FIG. 7 and the same features and optional features are relevant.

However here the harvesting unit 54 and transceiver module 51' are disposed deeper in the well, away from the lower end of the second casing 22b and outside of any protection that the second casing 22b may give. The repeater apparatus 5 of FIG. 10 is arranged for acoustic communications and/or EM communications.

The apparatus may optionally also include a remote battery pack 53 (shown in dotted lines) located at a cooler region in the well installation similar to the arrangements of FIGS. 6 and 9.

It should be noted that the examples of FIGS. 8 to 10 help to illustrate some of the alternatives mentioned earlier in the application and ideas mentioned in respect of each embodiment can be combined with each other embodiment where context allows.

Figure 11:
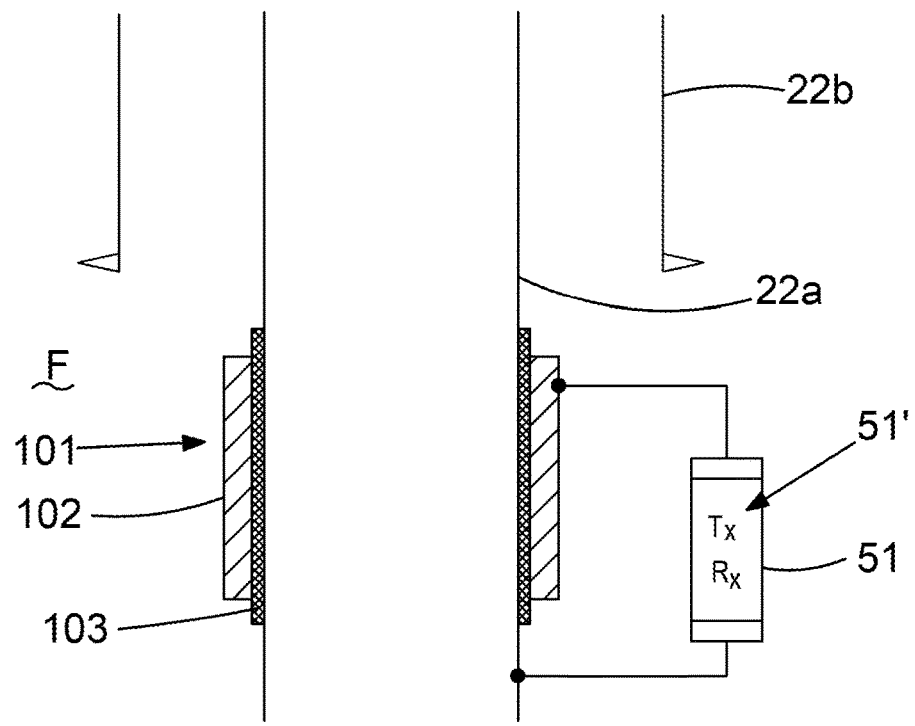
FIG. 11 shows a yet another repeater apparatus which may be used in a well installation similar to the type shown in FIG. 1.
Figure 12:
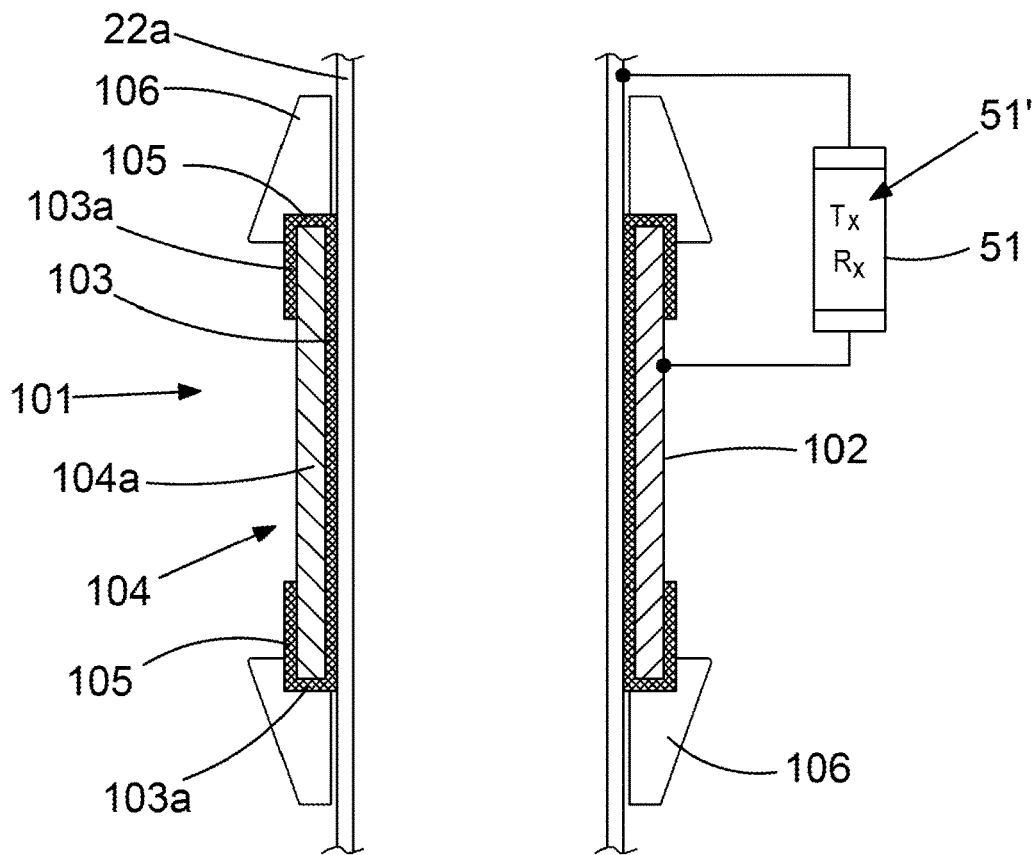
FIG. 12 shows a yet another repeater apparatus which may be used in a well installation similar to the type shown in FIG. 1.

FIGS. 11 and 12 shows further implementations of the repeater apparatus 5, here this is installed in a well installation that is similar to that shown in FIG. 1 but the insulating centraliser is omitted. The repeater apparatus 5 of FIGS. 11 and 12 are each arranged for EM communications although acoustic communications may also be provided. However at least the part of the repeater apparatus 5 used to apply signals to and/or pick up signals from the metallic structure (what can be considered a connection module) is disposed outside of the annulus and thus the insulating centraliser is not particularly useful.

In each of these cases the repeater apparatus 5 again comprises a transceiver module 51' including a transceiver 51 which is arranged for the application of and/or the pickup of electrical signals (and possibly also acoustic signals) from the metallic structure.

In both of these cases a different mechanism is used for the application of and/or or pick of electrical signals. In each case the repeater apparatus 5 comprises a sleeve electrode arrangement 101 which is mounted on the first run of downhole metallic pipe 22$a$.

Each sleeve electrode arrangement 101 comprises an electrically conductive sleeve 102 which is arranged to electrically contact with the surroundings, in particular the surrounding formation F. The sleeve 102 might for example be of Copper. An insulating layer 103 is provided between the conductive sleeve electrode 102 and the downhole metallic pipe 22$a$.

The transceiver 51 is connected to the electrode 102 on the one hand and the metallic structure on the other and is arranged to thereby pick up and/or apply electrical signals from/to the metallic structure.

In the case of the FIG. 11 arrangement the insulating layer 103 is an insulating coating, say of ceramic, which is applied the downhole pipe section. The conductive sleeve 102 is then applied as a coating over the insulating coating. Note that the insulating layer 103 extends further than each end of the conductive sleeve 102 to reduce the effect of local shorts.

In the case of the FIG. 12 arrangement there is a sleeve body 104 which comprises a conductive main body 104$a$ having an exposed portion which acts as the conductive sleeve 102. The main body may be of a single material or may comprise multiple parts, potentially of different materials—for example a Copper layer to act as the exposed surface of the conductive sleeve may be provided on a backing of steel.

The conductive main body 104$a$ has the insulating layer 103 applied to it as a coating. Further, end portions 105 of the conductive main body are also provided with an insulating coating 103$a$ to help reduce the effect of local shorts. A pair of chamfered annular clamps 106 are provided to clamp the sleeve body 104 to the downhole metallic pipe. The clamps 106 act on the insulated end portions. The clamps 106 are proud of the exposed surface of the sleeve 102 and thus help to protect it. The chamfers help to guide the pipe section in installation and further protect the sleeve 102.

The sleeve body 104 may be produced by coating the inner cylindrical surface of the conductive main body 104$a$ with the insulating coating, say by spraying. Similarly the end portions of the conductive main body may be spray coated. The main body may then be positioned over a length of downhole pipe, preferably just prior to installation, and clamped in position with the annular clamps 106.

In both cases the exposed portion of the conductive sleeve might have an area of say 3 square metres, and thus a length of say 5 metres to 10 metres on typical casing diameters.

The insulated end portions might extend say 1 metre.

The repeater apparatus of FIGS. 11 and 12 might be disposed in the region of the lower end of the second run of casing 22$b$ in the way discussed above. In some cases the sleeve electrode arrangement may be disposed at a level below (say just below) said lower end and other parts (say the transceiver 51' module) or a remainder of the apparatus provided higher and within the annulus.

Repeater apparatus using the connection mechanism shown in FIGS. 11 and 12 may make use of the other ideas described further above, such as the provision of a harvesting unit or a remote battery pack or so on. In general ideas mentioned in respect of each embodiment can be combined with each other embodiment where context allows.

The invention claimed is:

1. A wireless communication enabled well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein
   the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe; and
   the well installation comprises a remote power arrangement comprising a remote power source for powering the repeater apparatus, said remote power source being provided at a location which is spaced from the region where the repeater apparatus is arranged for at least one of picking up signals from the downhole metallic structure and applying signals to the downhole metallic structure, wherein
   the first run of downhole metallic pipe extends further into the borehole than the second run of downhole metallic pipe, such that the second run of downhole metallic pipe has a lower end past which the first run of downhole metallic pipe extends; and
   the repeater apparatus is disposed in the region of the lower end of the second run of downhole metallic pipe and arranged for at least one of picking up signals from the downhole metallic structure in the region of said lower end and applying signals to the downhole metallic structure in the region of said lower end, and
   wherein the repeater apparatus is disposed within the annulus defined by the first and second runs of downhole metallic pipe and within 100 m of said lower end of the second run of downhole metallic pipe; or
   the repeater apparatus is disposed in the borehole at a level below the annulus defined by the first and second runs of downhole metallic pipe and within 100 m of said lower end of the second run of downhole metallic pipe.

2. A wireless communication enabled well installation according to claim 1 in which the remote power arrangement comprises at least one of:
   a battery pack disposed at a shallower location in the borehole than a location at which the repeater apparatus at least one of picks up signals from and applies signals to the downhole metallic structure;
   a harvesting device for harvesting electrical power from the downhole metallic structure; and
   an electrical power source connected to the repeater via an electrical cable.

3. A wireless communication enabled well installation according to claim 2 in which the remote power arrangement comprises a harvesting device for harvesting electrical power from the downhole metallic structure and the remote power source comprises an electrical power source for applying electrical current to the downhole structure or a plurality of sacrificial cathodic protection anodes.

4. A wireless communication enabled well installation according to claim 2 in which the well installation comprises:
a remote power arrangement comprising an electrical power source connected to the repeater via an electrical cable; and
a communication unit at a location spaced from the repeater apparatus which communication unit is arranged for sensing voltage and/or current in a signal circuit including said cable,
wherein the repeater apparatus comprises variable impedance means for varying the impedance introduced into the signal circuit including said cable to encode data, and the communication unit is arranged to extract said data by monitoring variations in the voltage and/or current caused by the variable impedance means.

5. A wireless communication enabled well installation according to claim 2 in which the well installation comprises an annular sealing plug or device in said annulus at a level above the location at which the repeater apparatus at least one of picks up signals from and applies signals to the downhole metallic structure and the battery pack is disposed in the annulus above the level of the sealing plug or device.

6. A wireless communication enabled well installation according to claim 5 in which the repeater apparatus comprises downhole power supply apparatus located in the annulus above the annular sealing plug or device and below plug apparatus below the annular sealing plug or device and including a module in the region where the repeater apparatus at least one of picks up signals from and applies signals to the downhole metallic structure, wherein the power supply apparatus comprises the battery pack with the downhole power supply apparatus and below plug apparatus being arranged for delivering electrical power from the downhole power supply apparatus to the module across the annular sealing plug or device.

7. A wireless communication enabled well installation according to claim 6 in which the power supply apparatus comprises a power transfer arrangement for applying electrical current to the downhole metallic pipe above the plug; and
the below plug apparatus comprises a power pick up arrangement for picking up electrical current from the downhole metallic pipe below the plug to power the module.

8. A wireless communication enabled well installation according to claim 6 in which the below plug apparatus further comprises a local battery that may be used in preference to the battery pack whilst charge is available in the local battery.

9. A wireless communication enabled well installation according to claim 1 in which the repeater apparatus is installed into the well installation during a construction phase and the repeater apparatus comprises a repeater arrangement which arrangement is mounted on a length of downhole metallic pipe before this is introduced into the borehole as part of one of the runs of downhole metallic pipe.

10. A wireless communication enabled well installation according to claim 1 in which the installation further comprises an insulating centraliser provided in the annulus towards the lower end of the second run of downhole metallic pipe for holding the second run of downhole metallic pipe away from the first run of downhole metallic pipe and the repeater apparatus is arranged for at least one of picking up signals from the downhole metallic structure in the region of the insulating centraliser and applying signals to the downhole metallic structure in the region of the insulating centraliser.

11. A wireless communication enabled well installation according to claim 10 in which the repeater apparatus is disposed in the annulus.

12. A wireless communication enabled well installation according to claim 10 in which the insulating centraliser is disposed within 50 metres of the lower end of the second run of downhole metallic pipe.

13. A wireless communication enabled well installation according to claim 12 in which an insulating layer is provided on an outer surface of the first run of downhole metallic pipe in the region of the lower end of the second run of downhole metallic pipe.

14. A wireless communication enabled well installation according to claim 10 in which the insulating centraliser is disposed within 10 metres, of the lower end of the second run of downhole metallic pipe.

15. A wireless communication enabled well installation according to claim 1 in which where the repeater apparatus is disposed within the annulus defined by the first and second runs of downhole metallic pipe, the repeater is disposed within 10 m of said lower end of the second run of downhole metallic pipe; and
where the repeater apparatus is disposed in the borehole at a level below the annulus defined by the first and second runs of downhole metallic pipe, the repeater is disposed within 10 m of said lower end of the second run of downhole metallic pipe.

16. A wireless communication enabled well installation according to claim 1 in which the repeater apparatus comprises spaced contacts mechanically and electrically contacting with one of the runs of downhole metallic pipe at spaced locations on the run of downhole metallic pipe for at least one of picking up signals from and applying signals to said one of the runs of downhole metallic pipe.

17. A wireless communication enabled well installation according to claim 16 in which the repeater apparatus comprises an inductive choke disposed around said one of the runs of downhole metallic pipe for generating electrical impedance in said one of the runs of downhole metallic pipe between said spaced locations to enhance at least one of the picking up of signals from and applying of signals to said one of the runs of downhole metallic pipe.

18. A wireless communication enabled well installation according to claim 1 in which the repeater apparatus comprises a harvesting device for harvesting electrical power from the downhole metallic structure.

19. A wireless communication enabled well installation according to claim 18 in which the well installation comprises a cathodic protection system for applying cathodic protection currents to the downhole metallic structure and the harvesting device is arranged for harvesting electrical power from the cathodic protection currents.

20. A wireless communication enabled well installation according to claim 18 in which the well installation comprises an electrical power source for applying electrical power current to the downhole metallic structure and the harvesting device is arranged for harvesting electrical power from the electrical power currents.

21. A wireless communication enabled well installation according to claim 18 in which the harvesting device is electrically connected to the metallic structure at a first location and to the metallic structure at a second location spaced from the first location, the first and second locations being chosen such that, in use, there is a potential difference therebetween due to the electric current flowing in the structure; and the harvesting module being arranged to harvest electrical energy from the electric current.

22. A wireless communication enabled well installation according to claim 21 in which the spaced locations are axially spaced with contact being made to the same run of downhole metallic pipe and the spacing between the locations is 100 m or more.

23. A wireless communication enabled well installation according to claim 1 in which the repeater apparatus comprises at least one of a transmitter, receiver or transceiver which is controllable under the control of a control unit for selective use of a modulation scheme selected from at least two available modulation schemes with which the at least one of a transmitter, receiver or transceiver can function.

24. A wireless communication enabled well installation according claim 1 in which the repeater apparatus comprises a sleeve electrode arrangement comprising a conductive sleeve disposed around the first run of downhole metallic pipe arranged for electrical contact with the surroundings and an insulating layer disposed between the conductive sleeve and the first run of downhole metallic pipe for insulating the conductive sleeve therefrom.

25. A wireless communication enabled well installation according to claim 1 in which the repeater apparatus comprises a pair of contacts one contact in the pair mechanically and electrically contacting with the first run of downhole metallic pipe and another contact in the pair mechanically and electrically contacting with the second run of downhole metallic pipe for at least one of picking up signals from and applying signals to the downhole metallic structure.

26. A wireless communication enabled well installation construction method, the well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the method comprises a) installing downhole metallic structure which comprises first and second runs of downhole metallic pipe provided in a borehole, the first run of downhole metallic pipe being provided within the second run of downhole metallic pipe so as to define an annulus between the first and second runs of downhole metallic pipe; and b) installing the repeater apparatus into the well installation during a construction phase, further comprising performing steps a) and b) at a first time, and at a later time at least one year after said first time, installing communications equipment in the well installation for making use of the repeater apparatus.

27. A method according to claim 26 comprising performing the steps of claim 26 in a situation where no communications equipment is provided in the well installation for making use of the repeater apparatus at the time when the well construction is completed, but rather the repeater apparatus is installed to provide a communications backbone for future use.

28. A method according to claim 26 comprising the steps of installing a first set of communications equipment in the well installation for making use of the repeater apparatus at one time and then at a later time at least one year said one time, installing a second set of communications equipment in the well installation for making use of the repeater apparatus.

29. A well installation comprising downhole metallic structure and downhole repeater apparatus for receiving signals and in response transmitting signals onwards, the repeater apparatus being arranged for at least one of receiving the signals by picking up electrical signals from the downhole metallic structure and transmitting the signals onwards by applying electrical signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe and the first run of downhole metallic pipe extending further into the borehole than the second run of downhole metallic pipe, such that the second run of downhole metallic pipe has a lower end past which the first run of downhole metallic pipe extends and the installation further comprises an insulating centraliser provided in the annulus towards the lower end of the second run of downhole metallic pipe for holding the second run of downhole metallic pipe away from the first run of downhole metallic pipe and the repeater apparatus is disposed in the annulus and arranged for at least one of picking up signals from the downhole metallic structure in the region of the insulating centraliser and applying signals to the downhole metallic structure in the region of the insulating centraliser.

30. A wireless communication enabled well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe; and the well installation comprises a remote power arrangement comprising a remote power source for powering the repeater apparatus, said remote power source being provided at a location which is spaced from the region where the repeater apparatus is arranged for at least one of picking up signals from the downhole metallic structure and applying signals to the downhole metallic structure, wherein the first run of downhole metallic pipe extends further into the borehole than the second run of downhole metallic pipe, such that the second run of downhole metallic pipe has a lower end past which the first run of downhole metallic pipe extends; and the repeater apparatus is disposed in the region of the lower end of the second run of downhole metallic pipe and arranged for at least one of picking up signals from the downhole metallic structure in the region of said lower end and applying signals to the downhole metallic structure in the region of said lower end, wherein the remote power arrangement comprises an electrical power source connected to the repeater via an electrical cable;

the well installation further comprises a communication unit at a location spaced from the repeater apparatus which communication unit is arranged for sensing voltage and/or current in a signal circuit including said cable; and wherein the repeater apparatus comprises variable impedance means for varying the impedance introduced into the signal circuit including said cable to encode data, and the communication unit is arranged to extract said data by monitoring variations in the voltage and/or current caused by the variable impedance means.

31. A wireless communication enabled well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe; and the well installation comprises a remote power arrangement comprising a remote power source for powering the repeater apparatus, said remote power source being provided at a location which is spaced from the region where the repeater apparatus is arranged for at least one of picking up signals from the downhole metallic structure and applying signals to the downhole metallic structure, wherein the first run of downhole metallic pipe extends further into the borehole than the second run of downhole metallic pipe, such that the second run of downhole metallic pipe has a lower end past which the first run of downhole metallic pipe extends; and the repeater apparatus is disposed in the region of the lower end of the second run of downhole metallic pipe and arranged for at least one of picking up signals from the downhole metallic structure in the region of said lower end and applying signals to the downhole metallic structure in the region of said lower end, wherein the installation further comprises an insulating centraliser provided in the annulus towards the lower end of the second run of downhole metallic pipe for holding the second run of downhole metallic pipe away from the first run of downhole metallic pipe and the repeater apparatus is arranged for at least one of picking up signals from the downhole metallic structure in the region of the insulating centraliser and applying signals to the downhole metallic structure in the region of the insulating centraliser, and the repeater apparatus is disposed in the annulus.

32. A wireless communication enabled well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe; and the well installation comprises a remote power arrangement comprising a remote power source for powering the repeater apparatus, said remote power source being provided at a location which is spaced from the region where the repeater apparatus is arranged for at least one of picking up signals from the downhole metallic structure and applying signals to the downhole metallic structure, wherein the first run of downhole metallic pipe extends further into the borehole than the second run of downhole metallic pipe, such that the second run of downhole metallic pipe has a lower end past which the first run of downhole metallic pipe extends; and the repeater apparatus is disposed in the region of the lower end of the second run of downhole metallic pipe and arranged for at least one of picking up signals from the downhole metallic structure in the region of said lower end and applying signals to the downhole metallic structure in the region of said lower end, wherein the repeater apparatus comprises spaced contacts mechanically and electrically contacting with one of the runs of downhole metallic pipe at spaced locations on the run of downhole metallic pipe for at least one of picking up signals from and applying signals to said one of the runs of downhole metallic pipe.

33. A wireless communication enabled well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe; and the well installation comprises a remote power arrangement comprising a remote power source for powering the repeater apparatus, said remote power source being provided at a location which is spaced from the region where the repeater apparatus is arranged for at least one of picking up signals from the downhole metallic structure and applying signals to the downhole metallic structure, wherein the first run of downhole metallic pipe extends further into the borehole than the second run of downhole metallic pipe, such that the second run of downhole metallic pipe has a lower end past which the first run of downhole metallic pipe extends; and the repeater apparatus is disposed in the region of the lower end of the second run of downhole metallic pipe and arranged for at least one of picking up signals from the downhole metallic structure in the region of said lower end and applying signals to the downhole metallic structure in the region of said lower end, wherein the remote power arrangement comprises a battery pack disposed at a shallower location in the borehole than a location at which the repeater apparatus at least one of picks up signals from and applies signals to the downhole metallic structure; and the well installation comprises an annular sealing plug or device in said annulus at a level above the location at which the repeater apparatus at least one of picks up signals from and applies signals to the downhole metallic structure and the battery pack is disposed in the annulus above the level of the sealing plug or device.

34. A wireless communication enabled well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe; and the well installation comprises a remote power arrangement comprising a remote power source for powering the repeater apparatus, said remote power source being provided at a location which is spaced from the region where the repeater apparatus is arranged for at least one of picking up signals from the downhole metallic structure and applying signals to the downhole metallic structure, wherein the first run of downhole metallic pipe extends further into the borehole than the second run of downhole metallic pipe, such that the second run of downhole metallic pipe has a lower end past which the first run of downhole metallic pipe extends; and the repeater apparatus is disposed in the region of the lower end of the second run of downhole metallic pipe and arranged for at least one of picking up signals from the downhole metallic structure in the region of said lower end and applying signals to the downhole metallic structure in the region of said lower end, wherein the repeater apparatus comprises a harvesting device for harvesting electrical power from the downhole metallic structure, the harvesting device is electrically connected to the metallic structure at a first location and to the metallic structure at a second location spaced from the first location, the first and second locations being chosen such that, in use, there is a potential difference therebetween due to the electric current flowing in the structure;

the harvesting module is arranged to harvest electrical energy from the electric current, and the spaced locations are axially spaced with contact being made to the same run of downhole metallic pipe and the spacing between the locations is 100 m or more.

35. A wireless communication enabled well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe; and the well installation comprises a remote power arrangement comprising a remote power source for powering the repeater apparatus, said remote power source being provided at a location which is spaced from the region where the repeater apparatus is arranged for at least one of picking up signals from the downhole metallic structure and applying signals to the downhole metallic structure, wherein the first run of downhole metallic pipe extends further into the borehole than the second run of downhole metallic pipe, such that the second run of downhole metallic pipe has a lower end past which the first run of downhole metallic pipe extends; and the repeater apparatus is disposed in the region of the lower end of the second run of downhole metallic pipe and arranged for at least one of picking up signals from the downhole metallic structure in the region of said lower end and applying signals to the downhole metallic structure in the region of said lower end, wherein the repeater apparatus comprises at least one of a transmitter, receiver or transceiver which is controllable under the control of a control unit for selective use of a modulation scheme selected from at least two available modulation schemes with which the at least one of a transmitter, receiver or transceiver can function.

36. A wireless communication enabled well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the downhole metallic structure comprises first and second runs of downhole metallic pipe provided in a borehole, the first run of downhole metallic pipe being provided within the second run of downhole metallic pipe so as to define an annulus between the first and second runs of downhole metallic pipe; and the well installation comprises a remote power arrangement comprising a remote power source for powering the repeater apparatus, said remote power source being provided at a location which is spaced from the region where the repeater apparatus is arranged for at least one of picking up signals from the downhole metallic structure and applying signals to the downhole metallic structure, wherein the first run of downhole metallic pipe extends further into the borehole than the second run of downhole metallic pipe, such that the second run of downhole metallic pipe has a lower end past which the first run of downhole metallic pipe extends; and the repeater apparatus is disposed in the region of the lower end of the second run of downhole metallic pipe and arranged for at least one of picking up signals from the downhole metallic structure in the region of said lower end and applying signals to the downhole metallic structure in the region of said lower end, wherein the repeater apparatus comprises a sleeve electrode arrangement comprising a conductive sleeve disposed around the first run of downhole metallic pipe arranged for electrical contact with the surroundings and an insulating layer disposed between the conductive sleeve and the first run of downhole metallic pipe for insulating the conductive sleeve therefrom.

37. A wireless communication enabled well installation construction method, the well installation comprising downhole metallic structure and downhole repeater apparatus for receiving signals and in response transmitting signals onwards, the repeater apparatus being arranged for at least one of receiving the signals by picking up at least one of electrical and acoustic signals from the downhole metallic structure and transmitting the signals onwards by applying at least one of electrical and acoustic signals to the downhole metallic structure, wherein the method comprises installing downhole metallic structure which comprises first and second runs of downhole metallic pipe provided in a borehole, the first run of downhole metallic pipe being provided within the second run of downhole metallic pipe so as to define an annulus between the first and second runs of downhole metallic pipe; and installing the repeater apparatus into the well installation during a construction phase, the method further comprising installing a first set of communications equipment in the well installation for making use of the repeater apparatus at one time and then at a later time at least one year said one time, installing a second set of communications equipment in the well installation for making use of the repeater apparatus.

* * * * *